(12) United States Patent
Oishi et al.

(10) Patent No.: US 10,347,195 B2
(45) Date of Patent: Jul. 9, 2019

(54) DISPLAY UNIT, METHOD OF DRIVING DISPLAY UNIT, AND ELECTRONIC APPARATUS

(71) Applicant: Sony Corporation, Tokyo (JP)

(72) Inventors: Yuki Oishi, Kanagawa (JP); Akihito Nishiike, Kanagawa (JP)

(73) Assignee: Sony Corporation, Tokyo (JP)

( * ) Notice: Subject to any disclaimer, the term of this patent is extended or adjusted under 35 U.S.C. 154(b) by 208 days.

(21) Appl. No.: 15/528,408

(22) PCT Filed: Nov. 5, 2015

(86) PCT No.: PCT/JP2015/081132
§ 371 (c)(1),
(2) Date: May 19, 2017

(87) PCT Pub. No.: WO2016/084566
PCT Pub. Date: Jun. 2, 2016

(65) Prior Publication Data
US 2017/0337879 A1     Nov. 23, 2017

(30) Foreign Application Priority Data
Nov. 26, 2014 (JP) ................................. 2014-238541

(51) Int. Cl.
*G09G 3/34* (2006.01)
*G02F 1/167* (2019.01)
*G02F 1/1368* (2006.01)

(52) U.S. Cl.
CPC ........... *G09G 3/344* (2013.01); *G02F 1/1368* (2013.01); *G02F 1/167* (2013.01);
(Continued)

(58) Field of Classification Search
CPC ............ G09G 3/344; G09G 2310/065; G09G 2310/0254; G09G 2320/0271;
(Continued)

(56) References Cited

U.S. PATENT DOCUMENTS 9,047,839 B2 * 6/2015 Teranishi ............. G09G 3/3607
9,280,939 B2 * 3/2016 Muto .................... G09G 3/344
(Continued)

FOREIGN PATENT DOCUMENTS

| JP | 2009-175598 A | 8/2009 |
| JP | 2009-538451 A | 11/2009 |

(Continued)

*Primary Examiner* — Rodney Amadiz
(74) *Attorney, Agent, or Firm* — Wolf, Greenfield & Sacks, P.C.

(57) ABSTRACT

A display unit includes: a display section having an electrophoretic display device provided among a plurality of first electrodes and a second electrode, and displaying an image by switching a white, black, or gray-scale display state depending on an applied voltage; and a drive circuit driving the display section by varying a voltage applied to the first electrodes, while holding the second electrode at a common potential during a write period including frame period(s). When a first region of the display section has a first display state of white or black during a first write period, and an image of a second region thereof is changed while holding the first display state at the first region upon switchover from the first write period to a temporally-continued second write period, the drive circuit offsets the common potential toward a direction in which a voltage applied to the first region is raised.

20 Claims, 18 Drawing Sheets

WRITE PERIOD W1

WRITE PERIOD W2

(52) U.S. Cl.
CPC . *G02F 2203/02* (2013.01); *G09G 2310/0254* (2013.01); *G09G 2310/065* (2013.01); *G09G 2320/0204* (2013.01); *G09G 2320/0257* (2013.01); *G09G 2320/0271* (2013.01); *G09G 2320/066* (2013.01); *G09G 2330/02* (2013.01)

(58) Field of Classification Search
CPC ... G09G 2320/0257; G09G 2320/0204; G09G 2330/02; G09G 2320/066; G02F 1/1368; G02F 1/167; G02F 2203/02
USPC .......................................................... 345/691
See application file for complete search history.

(56) References Cited

U.S. PATENT DOCUMENTS

| | | |
|---|---|---|
| 2009/0189884 A1 | 7/2009 | Maeda |
| 2010/0201679 A1 | 8/2010 | Yoshii |
| 2010/0289838 A1 | 11/2010 | Markvoort et al. |
| 2013/0038621 A1 | 2/2013 | Choi et al. |

FOREIGN PATENT DOCUMENTS

| | | |
|---|---|---|
| JP | 2010-509632 A | 3/2010 |
| JP | 2010-181804 A | 8/2010 |
| JP | 2013-037366 A | 2/2013 |

* cited by examiner

[FIG. 1]
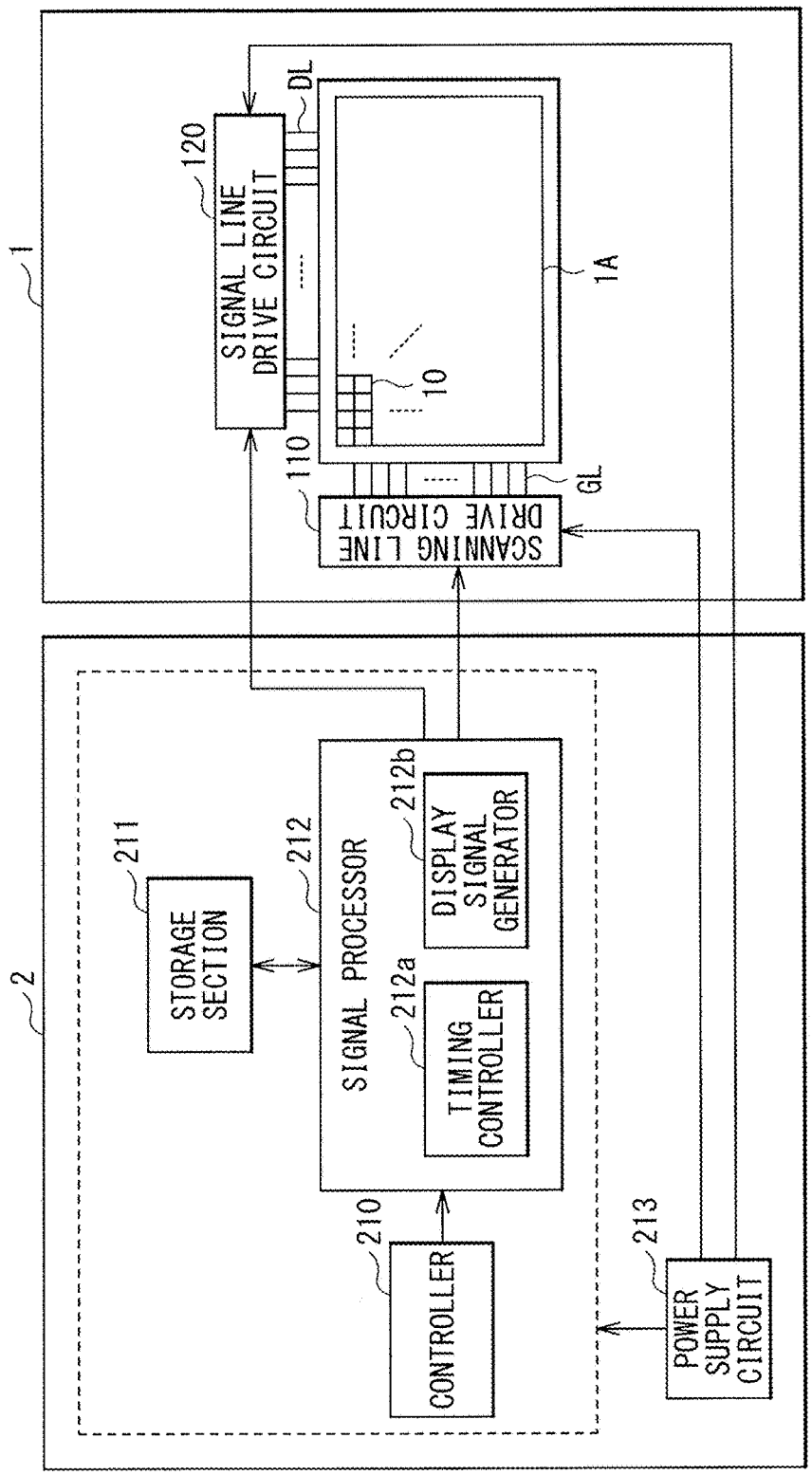

[ FIG. 2 ]
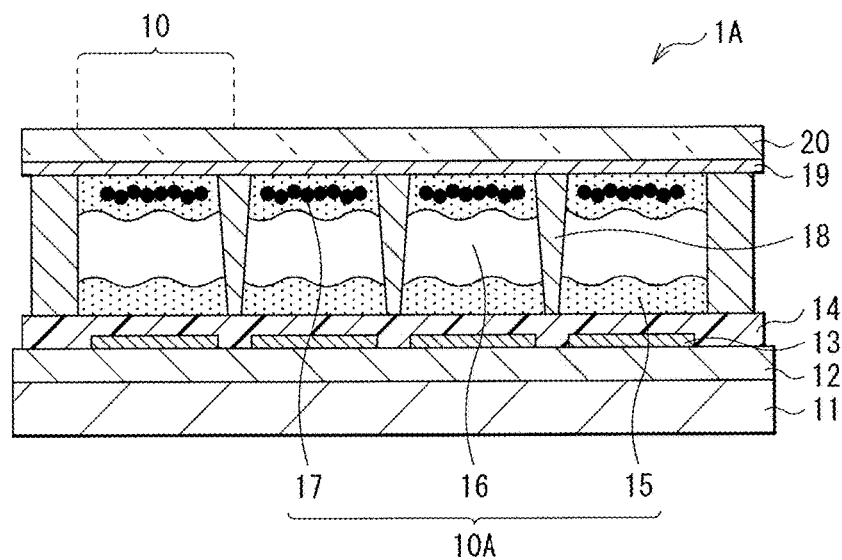
[ FIG. 3 ]
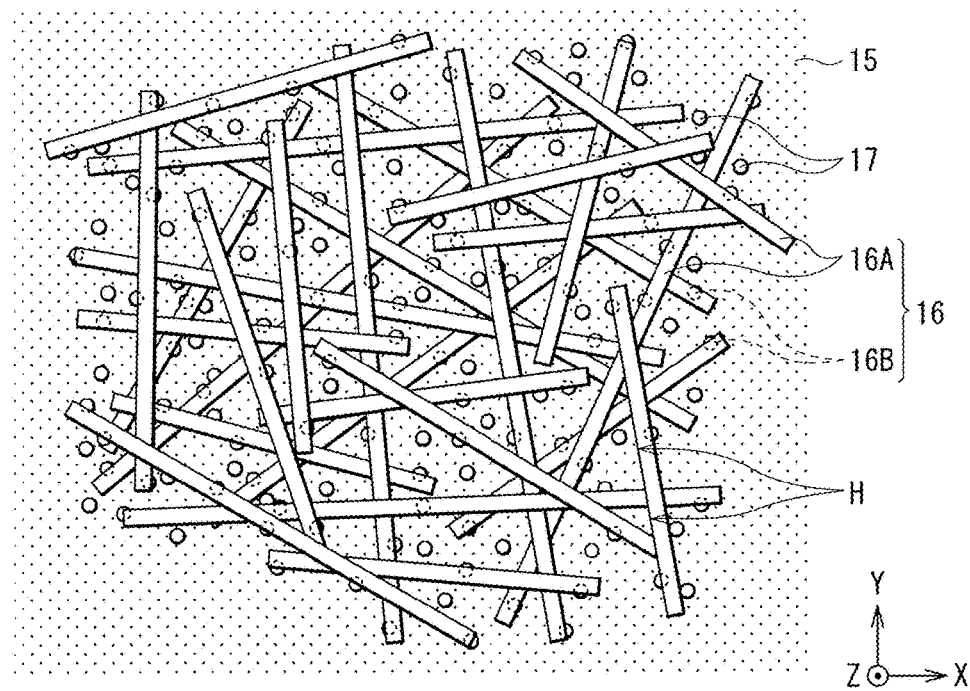

[ FIG. 4 ]
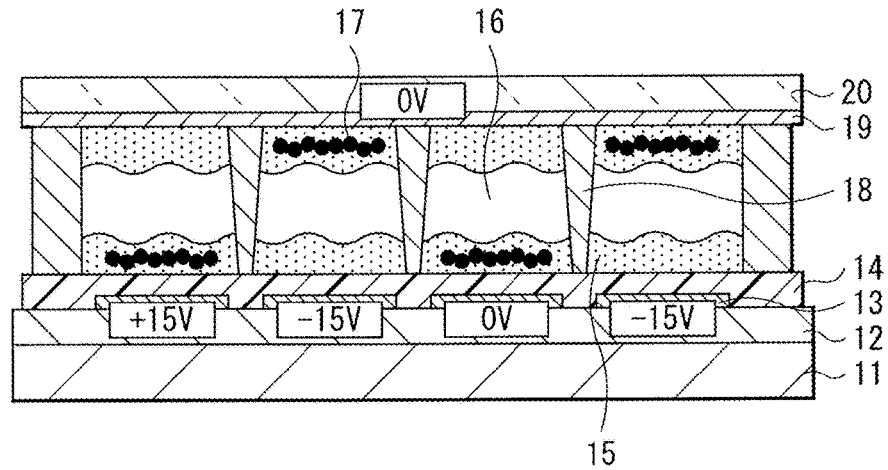
[ FIG. 5A ]
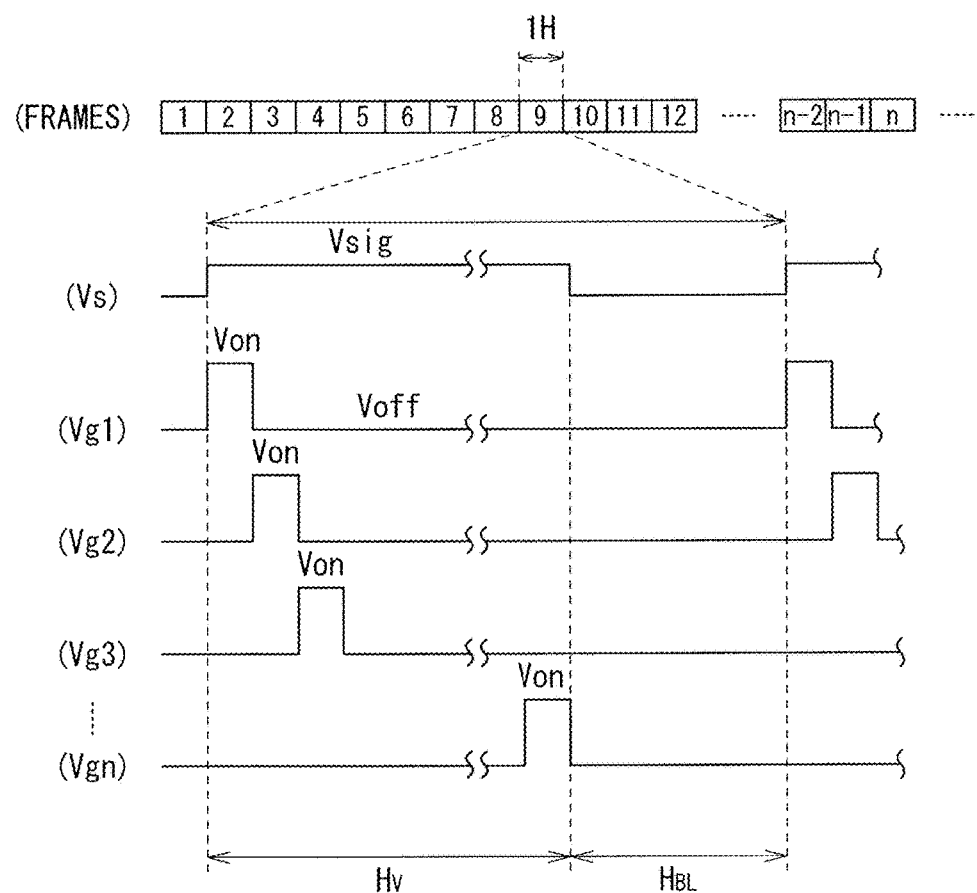

[ FIG. 5B ]
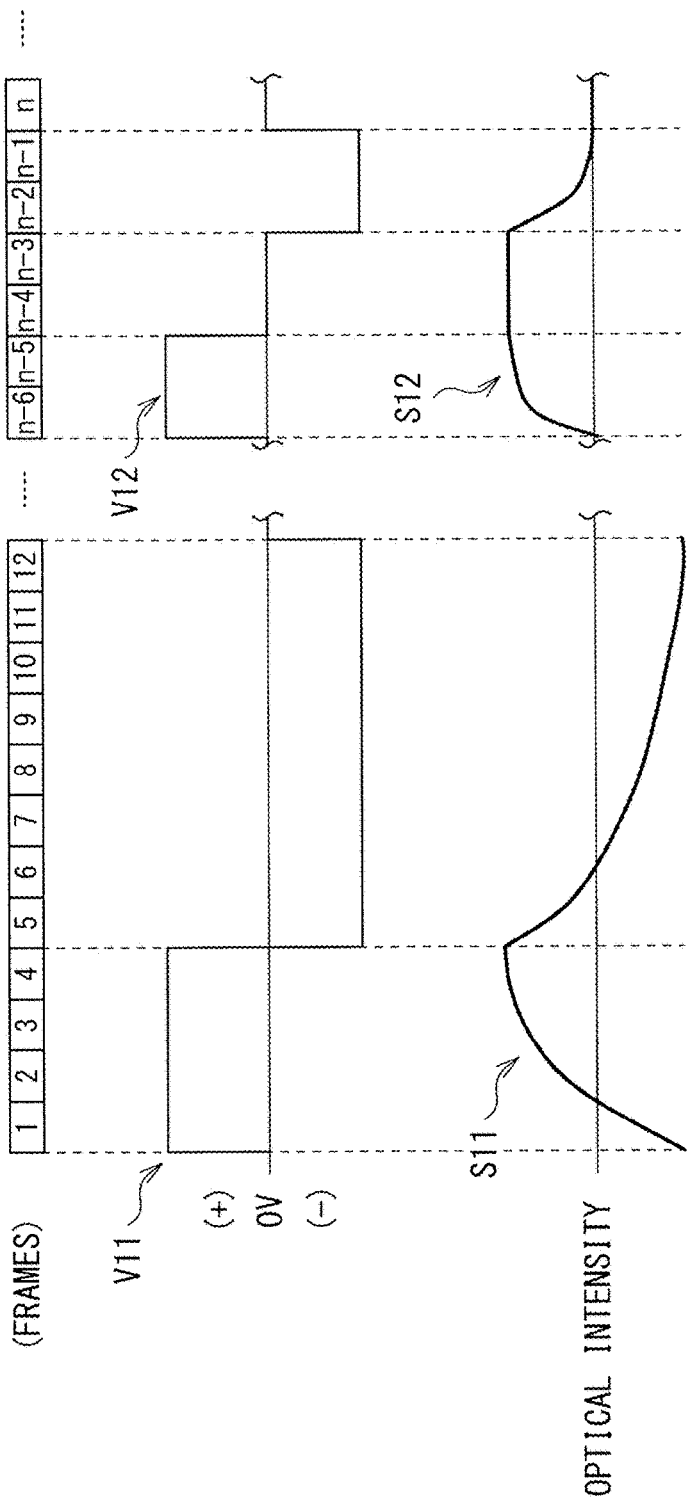

[FIG. 6]
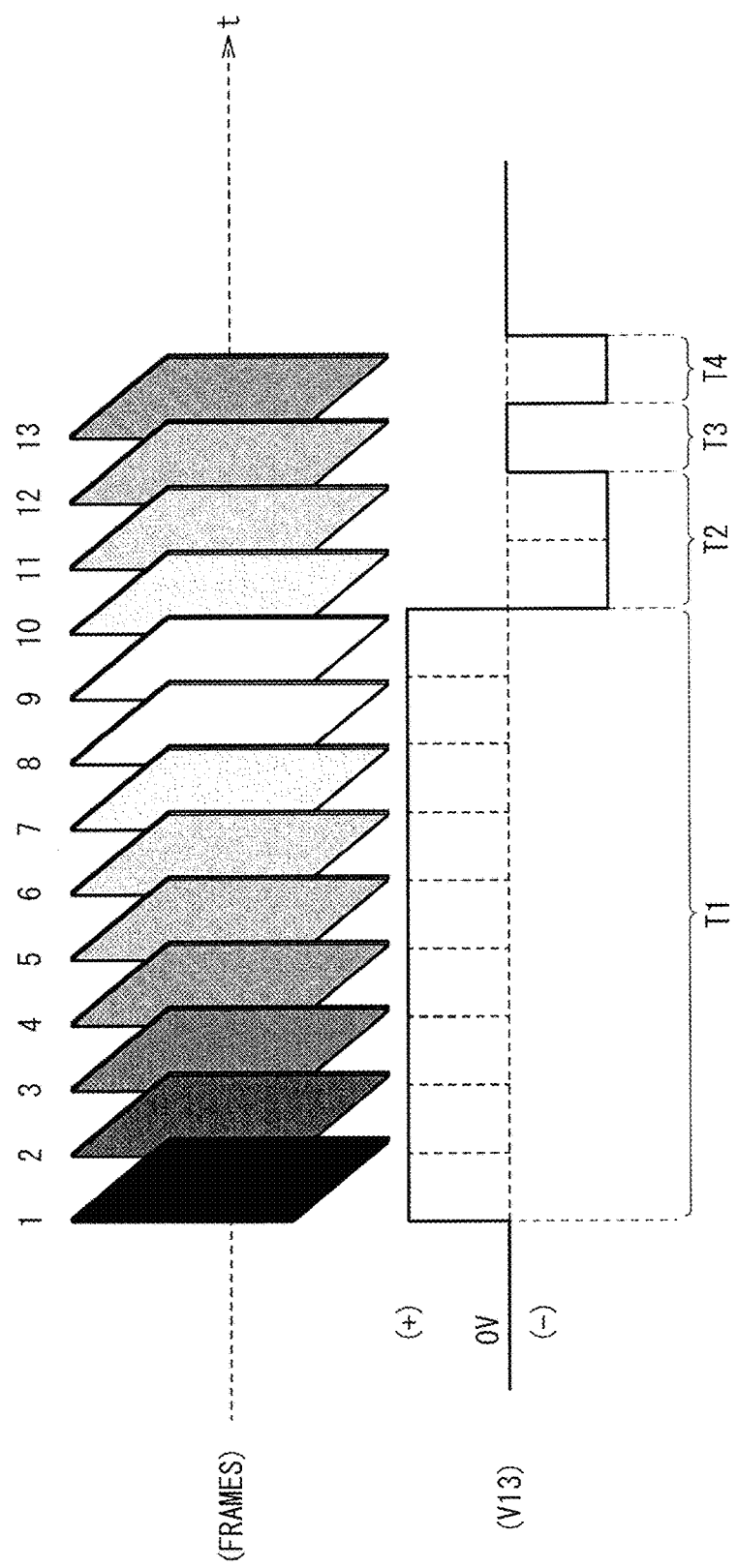

[ FIG. 7A ]
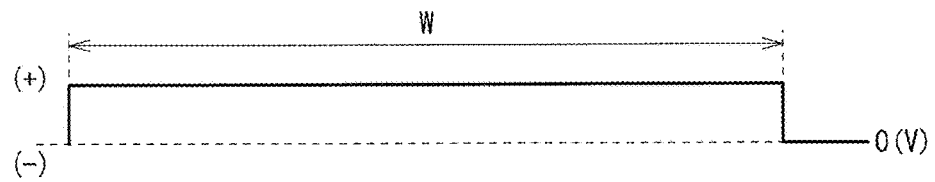
[ FIG. 7B ]
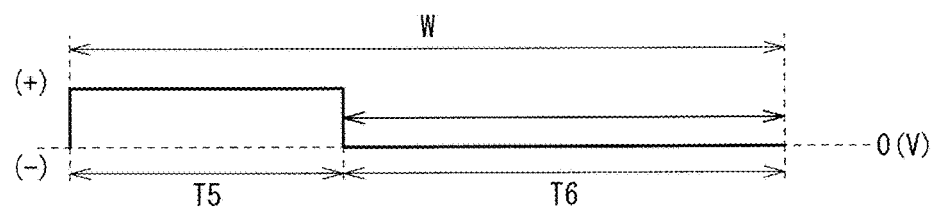
[ FIG. 7C ]
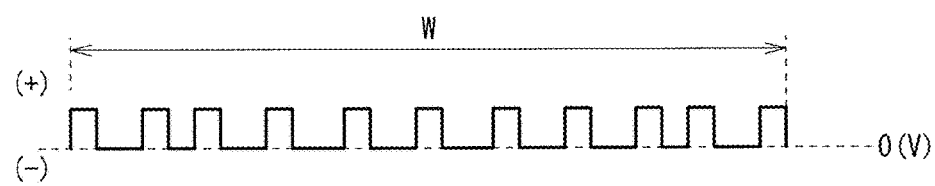
[ FIG. 7D ]
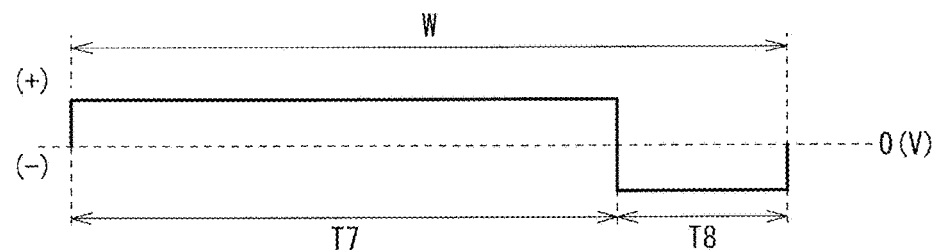

[ FIG. 8A ]
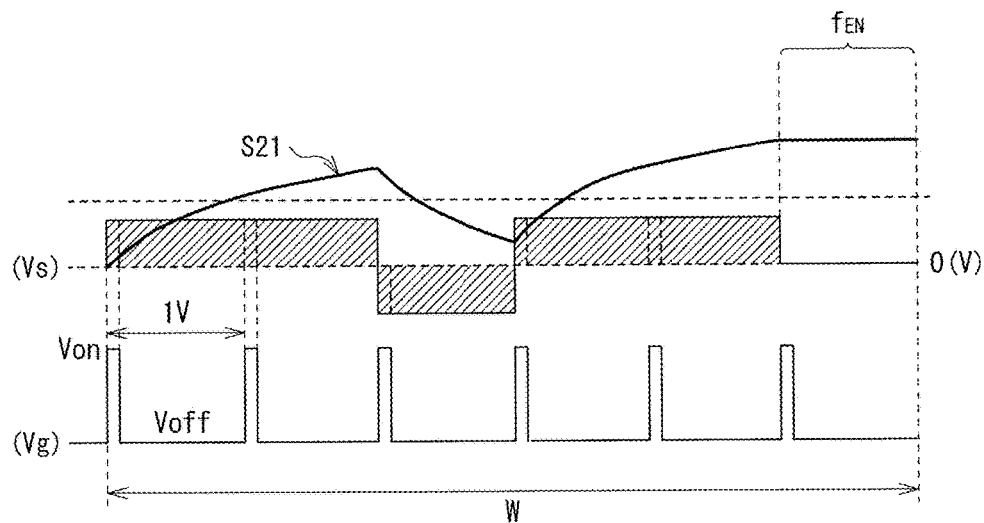
[ FIG. 8B ]
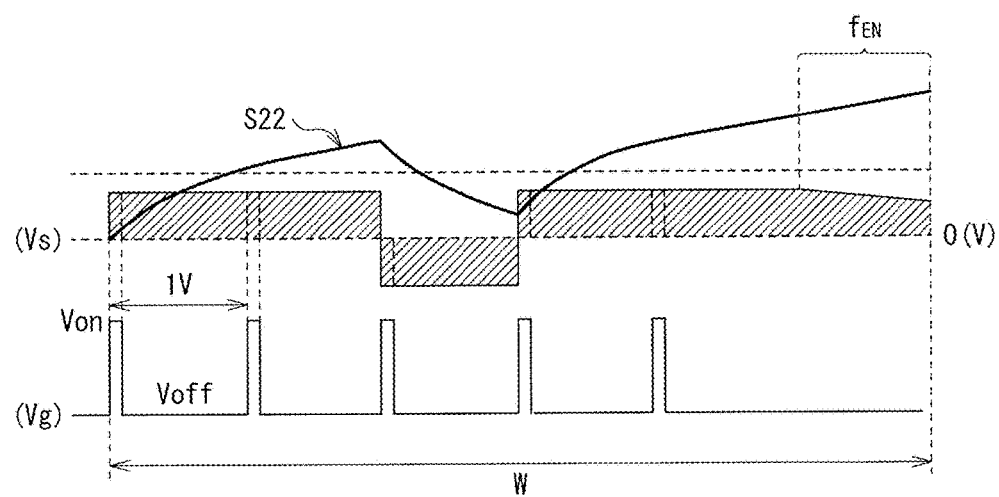

[ FIG. 9A ]
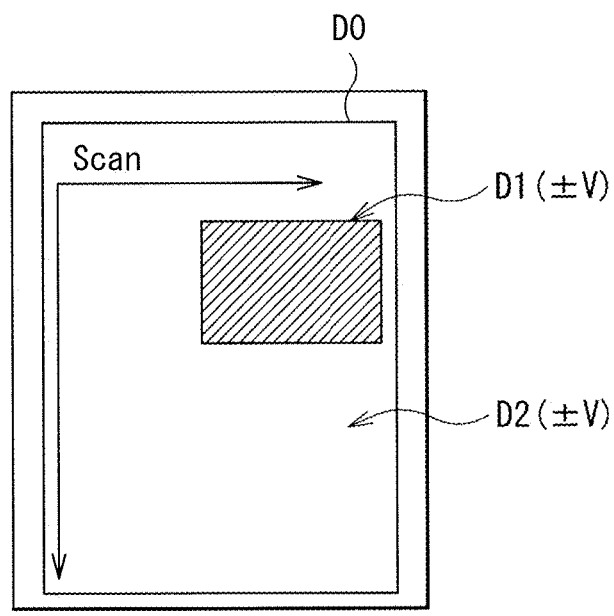
[ FIG. 9B ]
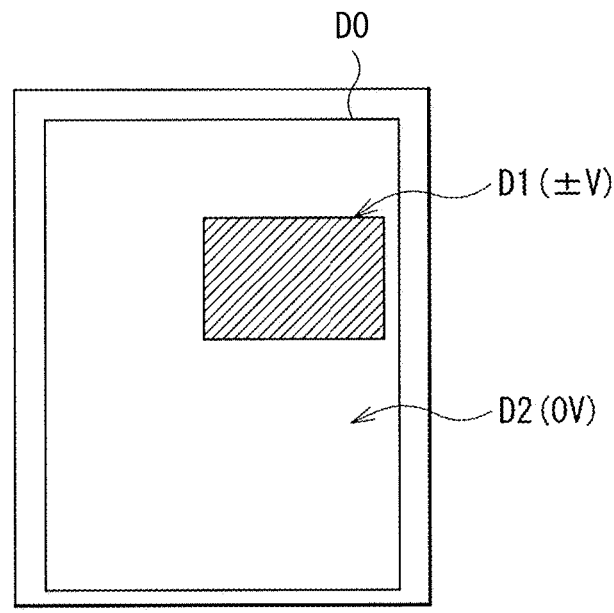

[ FIG. 10A ]
WRITE PERIOD W1
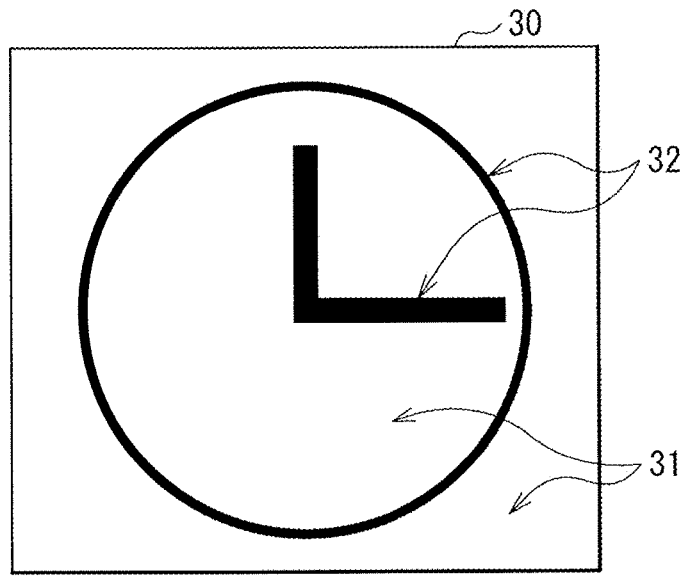
[ FIG. 10B ]
WRITE PERIOD W2
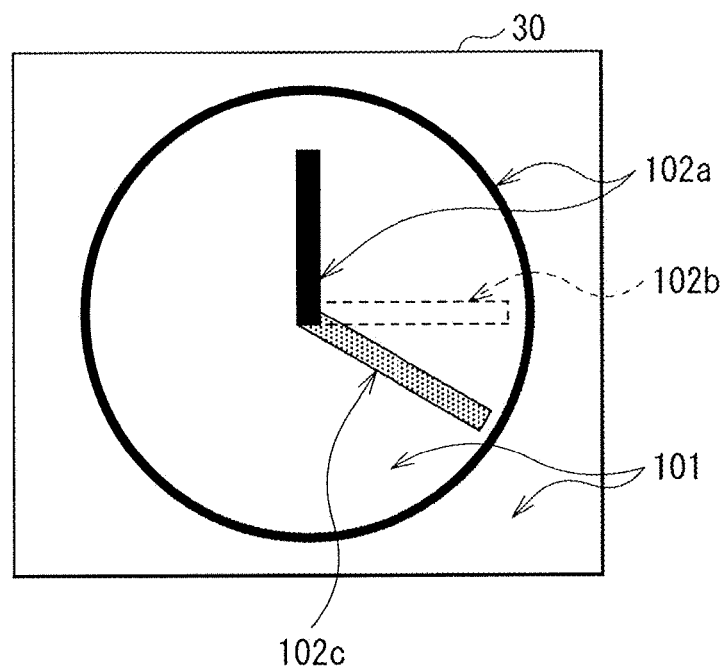

[ FIG. 11A ]
WRITE PERIOD W1
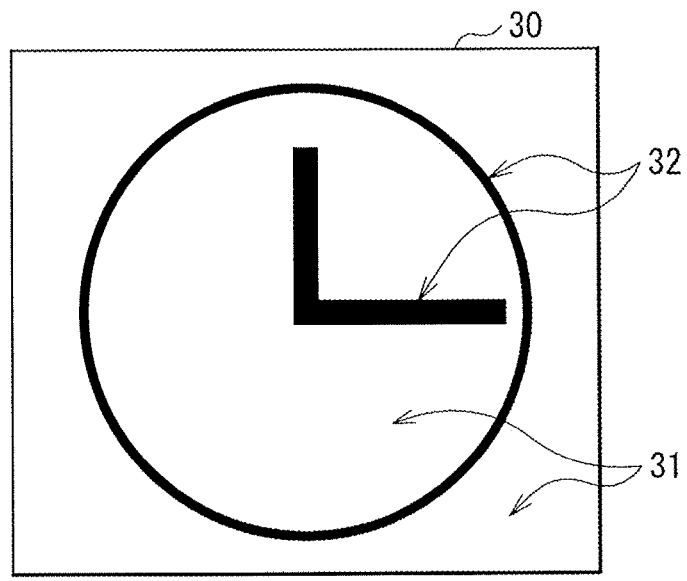
[ FIG. 11B ]
WRITE PERIOD W2
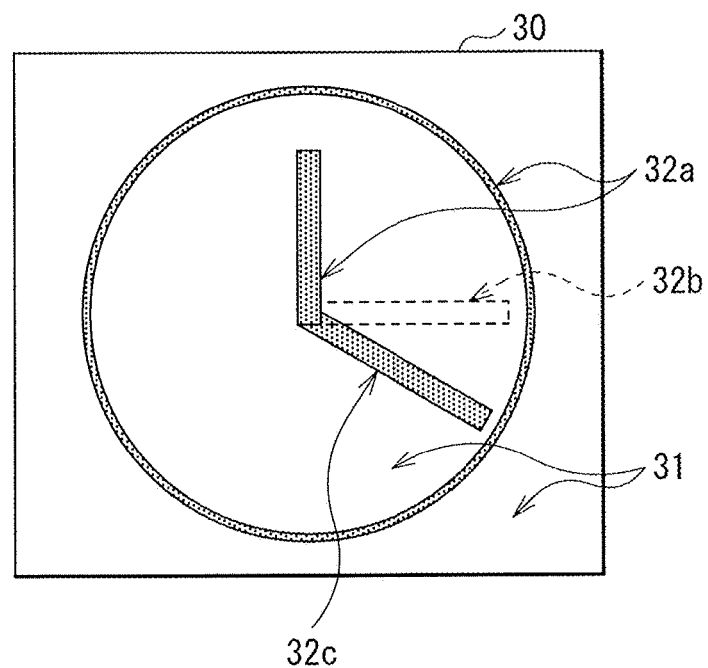

[ FIG. 11C ]
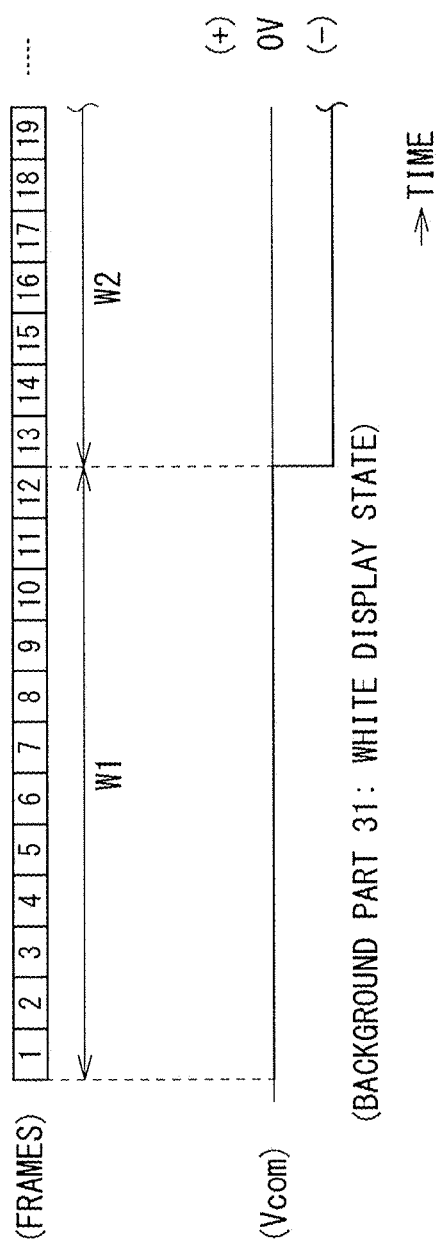

[ FIG. 12 ]
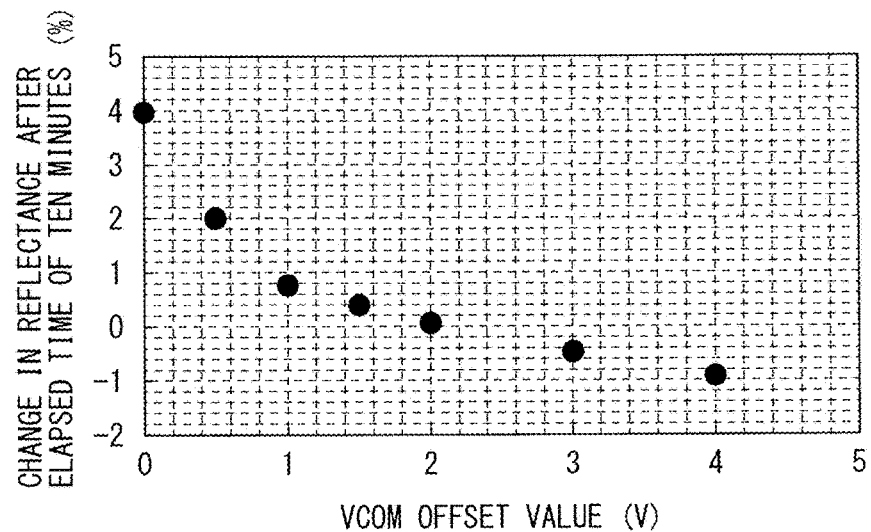
[ FIG. 13A ]
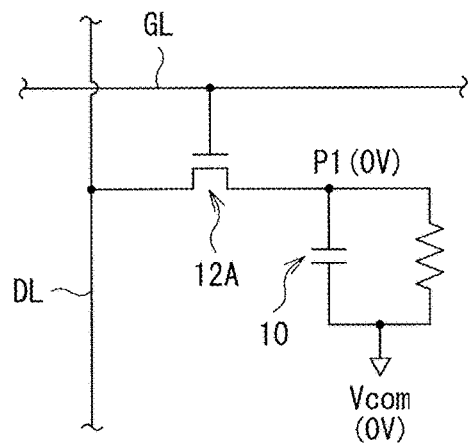
[ FIG. 13B ]
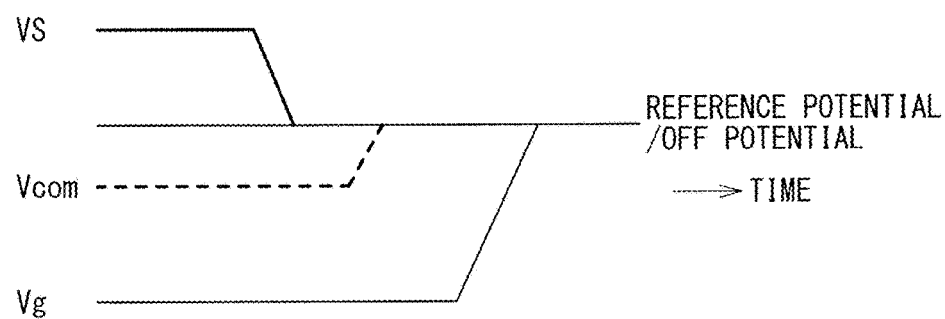

[ FIG. 14A ]
BACKGROUND PART
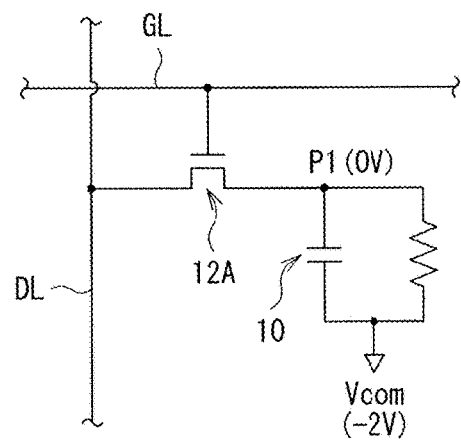
[ FIG. 14B ]
BACKGROUND PART
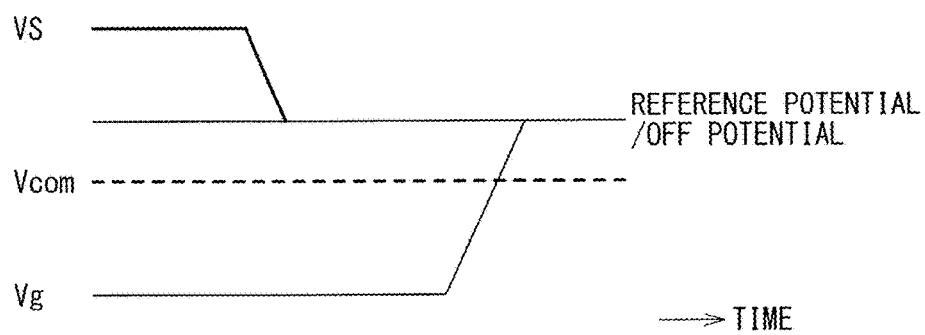

[ FIG. 15A ]
GRAPHIC PART
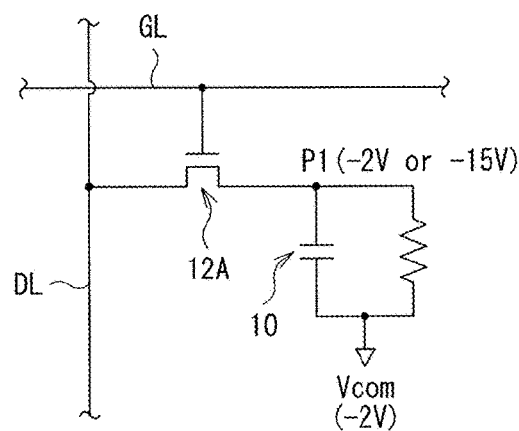
[ FIG. 15B ]
GRAPHIC PART
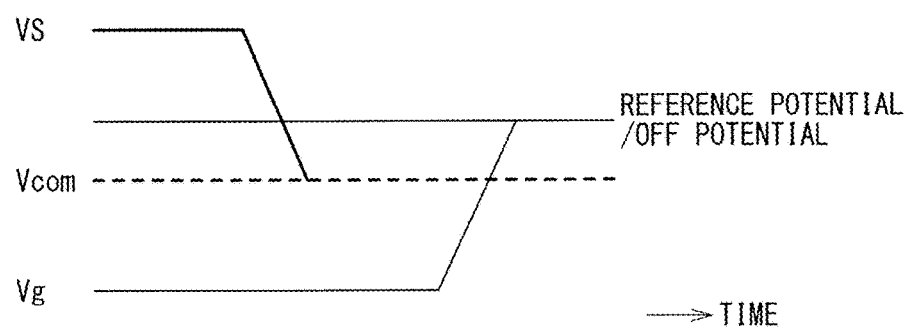

[ FIG. 16A ]
BACKGROUND PART
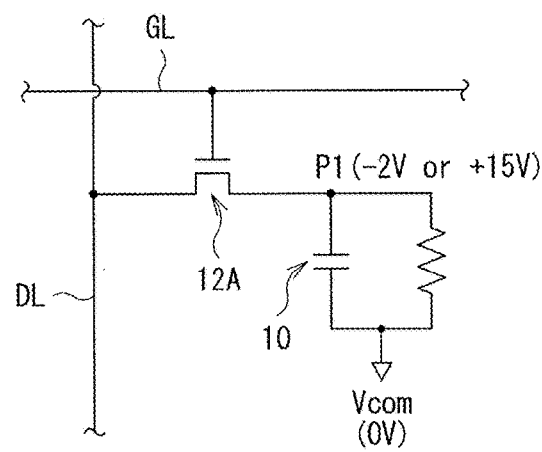
[ FIG. 16B ]
BACKGROUND PART
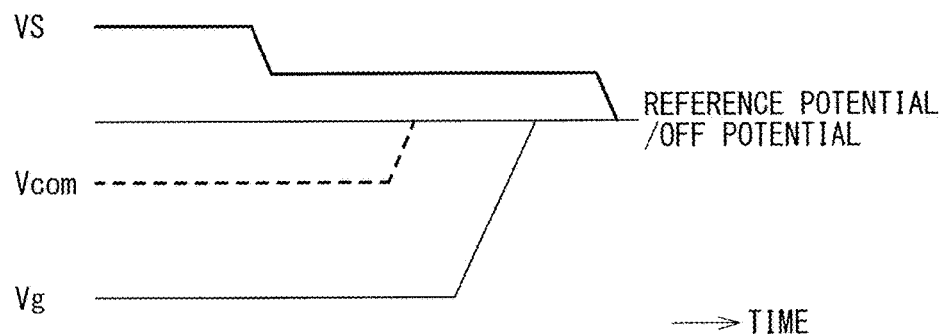

[ FIG. 17A ]
GRAPHIC PART
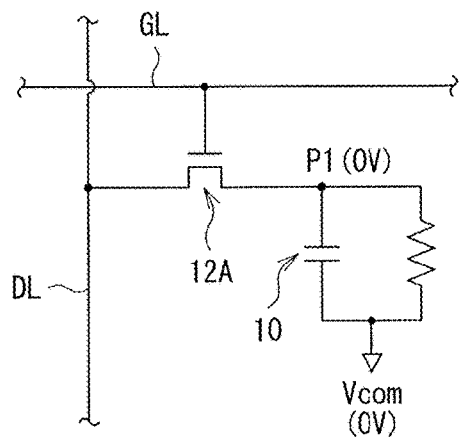
[ FIG. 17B ]
GRAPHIC PART
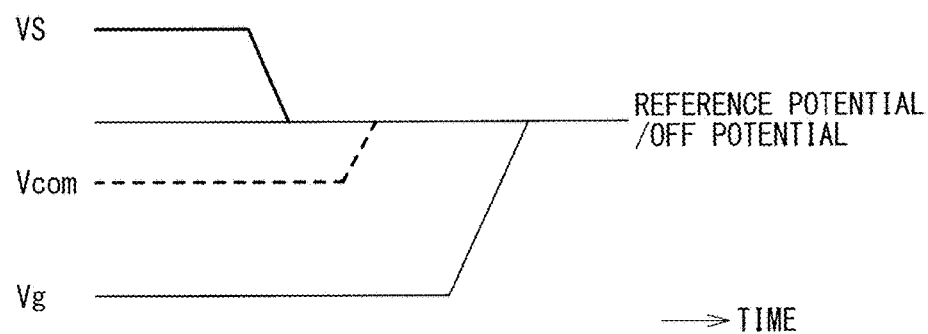

[ FIG. 18 ]
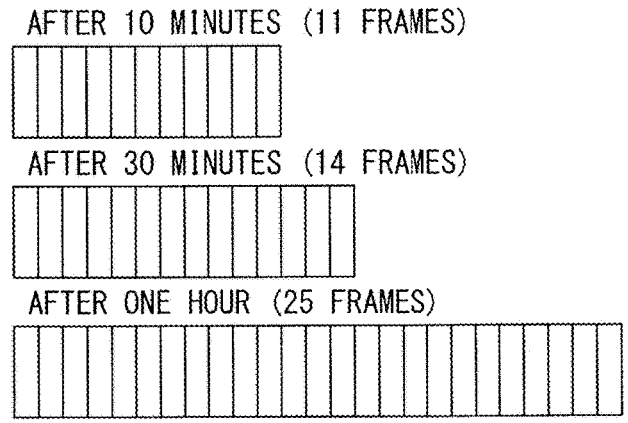
[ FIG. 19 ]
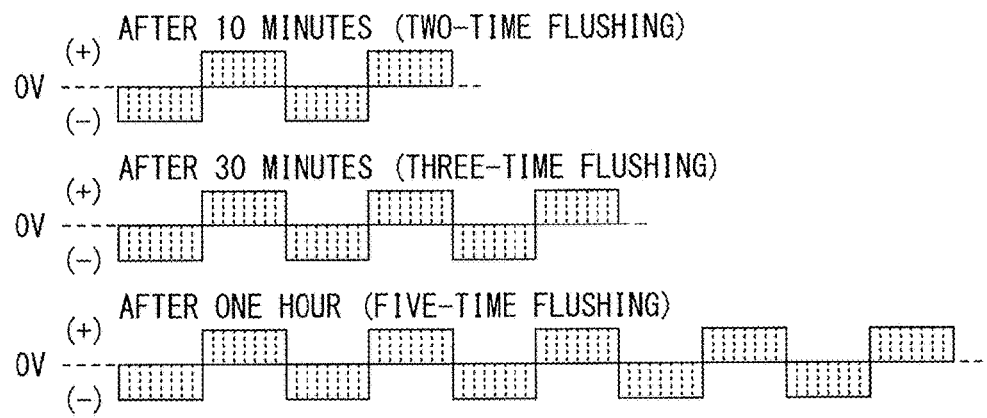
[ FIG. 20 ]
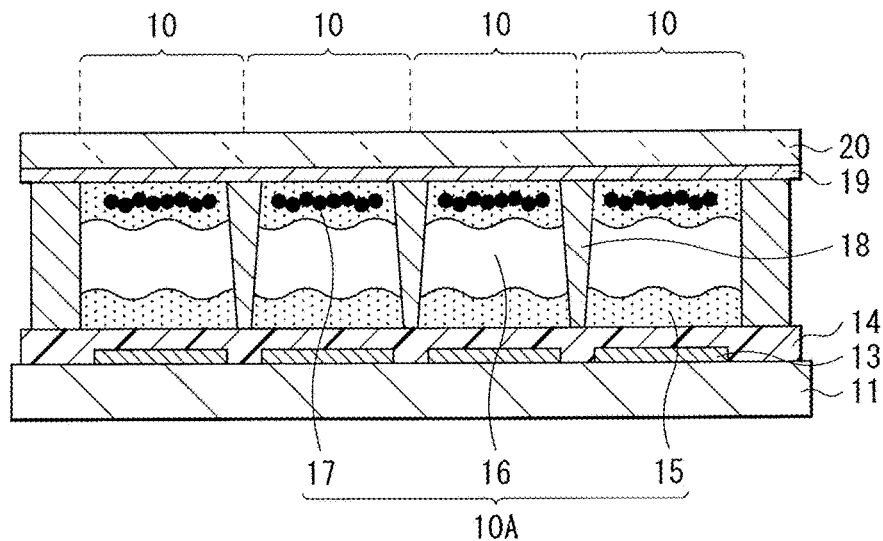

[ FIG. 21A ]
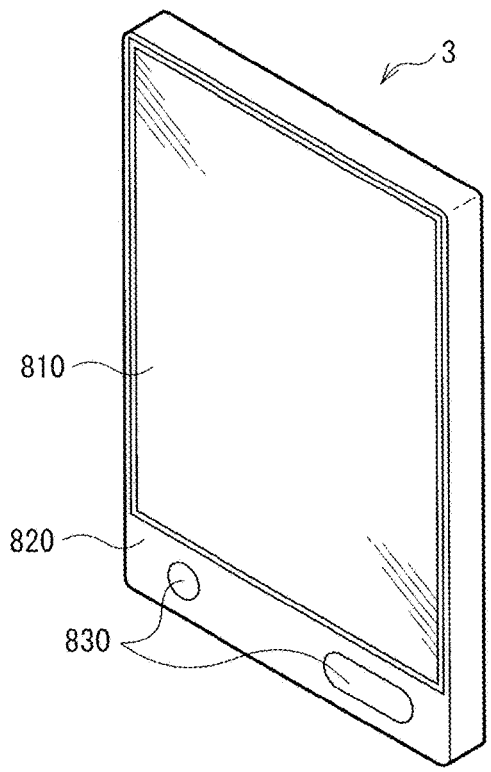
[ FIG. 21B ]
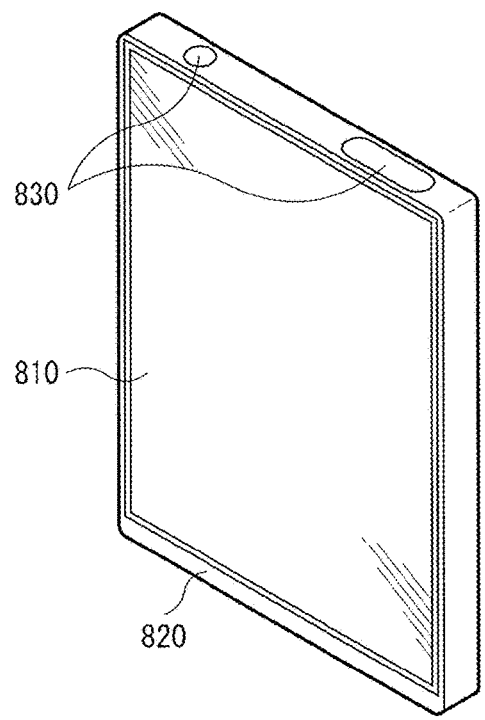

DISPLAY UNIT, METHOD OF DRIVING DISPLAY UNIT, AND ELECTRONIC APPARATUS

CROSS REFERENCE TO RELATED APPLICATIONS

This is a U.S. National Stage Application under 35 U.S.C. § 371, based on International Application No. PCT/JP2015/081132, filed Nov. 5, 2015, which claims priority to Japanese Patent Application JP 2014-238541, filed Nov. 26, 2014, each of which is hereby incorporated by reference in its entirety.

TECHNICAL FIELD

The disclosure relates to a display unit using an electrophoretic display device and a method of driving such a display unit, and to an electronic apparatus that includes such a display unit.

BACKGROUND ART

In recent years, digital signage has drawn attention that allows a variety of advertising contents to be delivered at low cost. In many cases, a transmissive display such as a liquid crystal display (LCD) is typically used for the digital signage. However, when such a display is used outdoors, it has difficulty in achieving a contrast ratio, and lacks visibility. Further, such a display has to carry out light emission not to be affected by outside light such as sunlight, thus leading to higher power consumption.

Meanwhile, as a display that achieves low power consumption, a reflective display such as an electronic paper that uses an electrophoretic display device has attracted attention. The electronic paper has come to be used also for display applications with low rewrite frequency such as a digital clock as well as for the digital signage application. The electronic paper is used in such a manner that power is once turned off upon completion of rewriting of one image, and thereafter power is turned on again at the time of new rewriting operation. This causes the contrast to be varied depending on elapsed time (update time) after power-off, resulting in deterioration in the visibility. Such a display property is referred to as memory performance. Further, a luminance difference is generated between a portion for which new rewriting operation is performed and a portion for which no rewrite operation is performed, leading to occurrence of a phenomenon referred to as a residual image. Such a phenomenon may provide a feeling of discomfort to a user.

Thus, PTL 1 proposes a method of applying supplementary pulses in the middle of write operation. The use of the supplementary pulses allows for compensation for a decrease in reflectance over time, which makes it possible to suppress the luminance difference between a rewritten portion and a non-rewritten portion, leading to suppression of occurrence of the residual image.

CITATION LIST

Patent Literature

[PTL 1] Japanese Unexamined Patent Application Publication (Published Japanese Translation of PCT Application) No. JP2009-538451

SUMMARY OF INVENTION

However, when the supplementary pulses are applied as proposed in the above-described PTL 1, a change in the reflectance at that time may be sometimes visually recognized by a user depending on factors such as the memory performance of a display element. Further, in the display element having a property of a significant change in the reflectance over time, the residual image may be visually recognized unless the supplementary pulses are applied frequently. Therefore, the achievement of a new method is desired that reduces the residual image as described above to allow for improvement of the display performance.

Accordingly, it is desirable to provide a display unit, a method of driving such a display unit, and an electronic apparatus that allow for improvement of the display performance.

A display unit according to an embodiment of the disclosure includes a display section and a drive circuit. The display section has an electrophoretic display device. The electrophoretic display device is provided among a plurality of first electrodes and a second electrode. The electrophoretic display device allows an image to be displayed by switching a white, black, or gray-scale display state depending on an applied voltage. The drive circuit performs display-drive of the display section by varying a voltage to be applied to the first electrodes, while holding the second electrode at a common potential during a write period including a single frame period or a plurality of frame periods. When a first region of the display section has a first display state of white or black during a first write period, and an image of a second region of the display section is changed while holding the first display state at the first region of the display section upon switchover from the first write period to a temporally-continued second write period, the drive circuit is configured to offset the common potential toward a direction in which a voltage applied to the first region of the display section is raised.

In a drive method according to an embodiment of the disclosure, display-drive is performed of a display section having an electrophoretic display device that is provided among a plurality of first electrodes and a second electrode, the electrophoretic display device allowing an image to be displayed by switching a white, black, or gray-scale display state, by varying a voltage to be applied to the first electrodes, while holding the second electrode at a common potential during a write period including a single frame period or a plurality of frame periods. When a first region of the display section has a first display state of white or black during a first write period, and an image of a second region of the display section is changed while holding the first display state at the first region of the display section upon switchover from the first write period to a temporally-continued second write period, the common potential is offset toward a direction in which a voltage applied to the first region of the display section is raised.

An electronic apparatus according to an embodiment of the disclosure includes the above-described display unit according to the embodiment of the disclosure.

In the display unit, the drive method thereof, and the electronic apparatus according to the respective embodiments of the disclosure, when an image of the second region of the display section is changed while holding the first display state at the first region of the display section upon switchover from the first write period to the temporally-continued second write period, drive is performed to offset the common potential toward a direction in which a voltage applied to the first region of the display section is raised. This makes it possible to correct a change in the reflectance over time at the first region.

According to the display unit, the drive method thereof, and the electronic apparatus of the respective embodiments of the disclosure, when an image of the second region of the display section is changed while holding the first display state at the first region of the display section upon switchover from the first write period to the temporally-continued second write period, drive is performed to offset the common potential toward a direction in which a voltage applied to the first region of the display section is raised. This makes it possible to correct a change in the reflectance over time at the first region, thereby allowing for suppression of occurrence of the residual image as well as suppression of deterioration in the contrast ratio. This allows the display performance to be improved.

It is to be noted that that the contents described above are mere examples of the disclosure. The effects of the disclosure are not limited to those described above, and may be other different effects, or may further include other effects in addition to the effects described above.

BRIEF DESCRIPTION OF DRAWINGS

FIG. 1 is a block diagram illustrating a configuration of a display unit according to a first embodiment of the disclosure along with a configuration of a driver.

FIG. 2 is a cross-sectional view of a configuration of a key part of a pixel section illustrated in FIG. 1.

FIG. 3 is a schematic diagram illustrating a configuration of a display element illustrated in FIG. 2.

FIG. 4 is a cross-sectional schematic diagram for explaining a method of driving the display unit illustrated in FIG. 1.

FIG. 5A is a timing chart for explaining the method of driving the display unit illustrated in FIG. 1.

FIG. 5B is a timing chart for explaining an example of gray-scale display operation.

FIG. 6 is a schematic diagram for describing transition of a display state relative to an applied voltage waveform.

FIG. 7A is a schematic diagram illustrating an example of an applied voltage waveform.

FIG. 7B is a schematic diagram illustrating an example of an applied voltage waveform.

FIG. 7C is a schematic diagram illustrating an example of an applied voltage waveform.

FIG. 7D is a schematic diagram illustrating an example of an applied voltage waveform.

FIG. 8A is a diagram illustrating optical response characteristics in a case where 0 V is applied in a final frame of a write period.

FIG. 8B is a diagram illustrating optical response characteristics in a case where 0 V is not applied in the final frame of the write period.

FIG. 9A is a schematic diagram for describing a partial display with no use of 0 V as an applied voltage.

FIG. 9B is a schematic diagram for describing a partial display (partial rewrite) with use of 0 V as an applied voltage.

FIG. 10A is a schematic diagram illustrating an example of an image displayed after a first write period.

FIG. 10B is a schematic diagram for describing a display rewrite operation during a second write period according to a comparative example.

FIG. 11A is a schematic diagram illustrating an example of an image displayed after the first write period.

FIG. 11B is a schematic diagram for describing a display rewrite operation during a second write period according to a working example.

FIG. 11C illustrates an example of a common potential waveform.

FIG. 12 is a characteristic diagram illustrating a relationship between an offset amount of a common potential and a change in reflectance after elapsed time of ten minutes.

FIG. 13A is a circuit diagram for describing a potential state at the end of the second write period.

FIG. 13B is a schematic diagram illustrating a timing sequence of a potential change until reaching the potential state illustrated in FIG. 13A.

FIG. 14A is a circuit diagram for describing an example of a potential state of a background part at the end of the second write period.

FIG. 14B is a schematic diagram illustrating a timing sequence of a potential change in the background part until reaching the potential state illustrated in FIG. 14A.

FIG. 15A is a circuit diagram for describing an example of a potential state of a graphic part at the end of the second write period.

FIG. 15B is a schematic diagram illustrating a timing sequence of a potential change in the graphic part until reaching the potential state illustrated in FIG. 15A.

FIG. 16A is a circuit diagram for describing another example of a potential state of the background part at the end of the second write period.

FIG. 16B is a schematic diagram illustrating a timing sequence of a potential change in the background part until reaching the potential state illustrated in FIG. 16A.

FIG. 17A is a circuit diagram for describing another example of a potential state of the graphic part at the end of the second write period.

FIG. 17B is a schematic diagram illustrating a timing sequence of a potential change in the graphic part until reaching the potential state illustrated in FIG. 17A.

FIG. 18 is a schematic diagram illustrating an example in a case where a time length of the second write period is changed.

FIG. 19 is a schematic diagram illustrating an example of an applied voltage waveform of a write section during the second write period.

FIG. 20 is a cross-sectional view of a configuration of a key part of a display unit according to a modification example 1.

FIG. 21A is a perspective view of a configuration of an electronic book according to an application example.

FIG. 21B is a perspective view of a configuration of the electronic book according to the application example.

DESCRIPTION OF EMBODIMENTS

Hereinafter, some embodiments of the disclosure are described in detail with reference to the drawings. It is to be noted that the description is given in the following order.
1. Embodiment (An example of an electrophoretic display unit that carries out drive of offsetting a common potential in the case of performing image rewrite while holding a white display state of a background part)
2. Modification Example (An example of a drive method with no use of TFT devices)
3. Application Example (An example of an electronic book)

Embodiment

[Configuration]
FIG. 1 illustrates a configuration of a display unit (display unit 1) according to an embodiment of the disclosure along with a configuration of a driver thereof (driver 2). The display unit 1 may be an electrophoretic display unit that displays images utilizing an electrophoretic phenomenon, and may be a so-called electronic paper display.

The display unit 1 may have a plurality of pixels 10 (a pixel section 1A) that are display-driven with use of, for example, an active-matrix drive method using TFT devices. The pixel section 1A (display section) may include an electrophoretic display device (display element 10A), and may display characters and images by varying optical reflectance of the display element 10A. The pixel section 1A may be coupled to a scanning line drive circuit 110 and a signal line drive circuit 120. The pixel 10 may be provided at each of intersection points of a plurality of scanning lines GL that are extended along a row direction from the scanning line drive circuit 110 and a plurality of signal lines DL that are extended along a column direction from the signal line drive circuit 120.

The scanning line drive circuit 110 may select the plurality of pixels 10 sequentially by applying scanning signals sequentially to the plurality of scanning lines GL in accordance with a control signal to be supplied from the driver 2. The signal line drive circuit 120 may generate an analog signal corresponding to a display-use signal in accordance with the control signal to be supplied from the driver 2 to apply such a resulting analog signal to each of the signal lines DL. The display-use signal (signal voltage) that is applied to each of the signal lines DL by the signal line drive circuit 120 may be applied to the pixel 10 that is selected by the scanning line drive circuit 110.

The driver 2 may be a drive section that performs signal generation, power supply, or any other operation that are necessary for display-driving of the display unit 1. The driver 2 may include, for example, a controller 210, a storage section 211, a signal processor 212, and a power supply circuit 213. The signal processor 212 may have, for example, a timing controller 212a and a display-use signal generator 212b. The timing controller 212a and the display-use signal generator 212b may generate various signals to be outputted to the scanning lines GL and the signal lines DL, signals that control timing of application of those signals, or any other signals to be hereinafter described. It is to be noted that each of the driver 2, the scanning line drive circuit 110, and the signal line drive circuit 120 corresponds to a specific example of a "drive circuit" in the disclosure.

[Detailed Configuration Example of Display Unit 1]

FIG. 2 illustrates a configuration of a key part of the pixel section 1A of the display unit 1. FIG. 3 schematically illustrates a configuration of the display element 10A. In the pixel section 1A, for example, a plurality of first electrodes (pixel electrodes) 13 may be provided with a TFT layer 12 in between on a first substrate 11. A sealing layer 14 may be provided to cover the TFT layer 12 and the first electrodes 13, and the display element 10A may be provided on the sealing layer 14. On the display element 10A, a second electrode (counter electrode) 19 and a second substrate 20 may be disposed in this order. In such a configuration, a predetermined voltage may be applied to the display element 10A through the first electrodes 13 and the second electrode 19 by holding the second electrode 19 at a common potential (Vcom), while varying a display-use voltage that is applied to the first electrodes 13. The display element 10A may be configured to vary the optical reflectance (to generate contrast) depending on the applied voltage. For example, a configuration of the display element 10A is not specifically limitative; however, it may include porous layers 16 and electrophoretic particles 17 in insulating liquid 15. The display element 10A may be separated for each of the pixels 10 by a bulkhead 18. It is to be noted that, in this example, an electrophoretic device may be configured to be segmented by the bulkhead 18; however, a configuration of the electrophoretic device is not limited thereto, and any other configuration (for example, a capsule-like configuration or a configuration without bulkheads) may be acceptable.

The first substrate 11 may be made of, for example, an inorganic material, a metallic material, or a plastic material. Examples of the inorganic material may include silicon (Si), silicon oxide (SiOx), silicon nitride (SiNx), and aluminum oxide (AlOx). Examples of the silicon oxide may include glass and spin-on glass (SOG). Examples of the metallic material may include aluminum (Al), nickel (Ni), or stainless steel. Examples of the plastic material may include polycarbonate (PC), polyethylene terephthalate (PET), polyethylene naphthalate (PEN), and polyethyletherketone (PEEK).

The TFT layer 12 may be a layer on which switching devices (TFT devices 12A to be hereinafter described) that select pixels are provided. The TFT device 12A either may be an inorganic TFT that uses an inorganic semiconductor layer including, for example, amorphous silicon, polysilicon, or an oxide as a channel layer, or may be an organic TFT using an organic semiconductor layer including pentacene or any other material. Further, a type of the TFT device is not specifically limitative, and may be an inversely-staggered structure (so-called bottom-gate type), or a staggered structure (so-called top-gate type), for example. Each of the TFT devices 12A may be disposed for each of the pixels 10 to be electrically coupled to the first electrode 13, and to be turned on/off by a scanning signal to be applied through the scanning line GL.

The first electrode 13 may include one kind or more kinds of conductive materials such as gold (Au), silver (Ag), and copper (Cu), for example. The plurality of first electrode 13 may be disposed in matrix in the pixel section 1A.

The sealing layer 14 may be made of an adhesive resin material.

The insulating liquid 15 may be a non-aqueous solvent such as an organic solvent, for example, and may be specifically a paraffin or isoparaffin. The viscosity and refractive index of the insulating liquid 15 may be preferably as low as possible. This is because the mobility (response speed) of the electrophoretic particles 17 is improved, and an energy (power consumption) necessary for movement of the electrophoretic particles 17 is reduced accordingly. Further, this is also because the optical reflectance of the porous layer 16 is increased due to an increased difference between the refractive index of the insulating liquid 15 and that of the porous layer 16.

It is to be noted that the insulating liquid 15 may contain a variety of materials as appropriate. For example, the insulating liquid 15 may contain coloring agent, charge-controlling agent, dispersion stabilizer, viscosity-preparing agent, surfactant, or resin.

The electrophoretic particles 17 may be charged particles that are movable between the first electrode 13 and the second electrode 19, being dispersed in the insulating liquid 15. The electrophoretic particles 17 may be movable between the first electrode 13 and the second electrode 19 in the insulating liquid 15. The electrophoretic particles 17 may be particles (powders) including one kind or two kinds or more of any materials such as organic pigment, inorganic pigment, dye, carbon material, metallic material, metal oxide, glass, and polymer material (resin), for example. It is to be noted that the electrophoretic particles 17 may be alternatively pulverized particles or capsule particles with resin solid content including the above-described particles. However, the materials corresponding to the carbon material, metallic material, metal oxide, glass, or polymer material are to be excluded from the materials corresponding to the organic pigment, inorganic pigment, or dye. As the electrophoretic particles 17, one kind or a plurality of kinds of any of the above-described materials may be used.

The content (density) of the electrophoretic particles 17 in the insulating liquid 15 is not specifically limitative; however, it may be, for example, within the range of 0.1% by weight to 10% by weight both inclusive. This is because the shielding (hiding) property and mobility of the electrophoretic particles 17 are assured. In this case, when the content is less than 0.1% by weight, there is a possibility that it may be difficult for the electrophoretic particles 17 to shield the porous layer 16. On the contrary, when the content is more than 10% by weight, it may be difficult for the electrophoretic particles 17 to migrate due to deterioration in dispersibility of the electrophoretic particles 17, resulting in aggregation of the electrophoretic particles 17 in some cases.

Further, the electrophoretic particles 17 may also have given light reflective property (optical reflectance). The optical reflectance of the electrophoretic particles 17 is not specifically limitative; however, it may be preferably set at least to ensure that the electrophoretic particles 17 shield the porous layer 16. This is because the contrast is intended to be generated by utilizing a difference between the optical reflectance of the electrophoretic particles 17 and the optical reflectance of the porous layer 16.

A specific constituent material of the electrophoretic particle 17 may be selected, for example, depending on the role assumed by the electrophoretic particle 17 to generate the contrast. Examples of a material to be used when bright display (white display) is performed with use of the electrophoretic particles 17 may include a metal oxide such as titanium oxide, zinc oxide, zirconium oxide, barium titanate, and potassium titanate; above all, titanium oxide is preferable. This is because titanium oxide has superior electrochemical stability and dispersibility, and may achieve high reflectance. On the other hand, examples of a material to be used when dark display (black display) is performed with use of the electrophoretic particles 17 may include carbon material and metal oxide. Examples of the carbon material may include carbon black. Examples of the metal oxide may include copper-chromium oxide, copper-manganese oxide, copper-iron-manganese oxide, copper-chromium-manganese oxide, and copper-iron-chromium oxide.

An color to be visually recognized of the electrophoretic particle 17 from the outside when the bright display is performed with use of the electrophoretic particles 17 is not specifically limitative as long as it is possible to generate the contrast; however, it may be preferably white or a color close to white. On the other hand, an color to be visually recognized from the outside of the electrophoretic particle 17 when the dark display is performed with use of the electrophoretic particles 17 is not specifically limitative as long as it is possible to generate the contrast; however, it may be preferably black or a color close to black. This is because the contrast is enhanced in any case.

It is to be noted that the electrophoretic particles 17 may be preferably easy to be dispersed and charged in the insulating liquid 15 over a long period of time, and may be preferably hard to be adsorbed to the porous layer 16. Therefore, to disperse the electrophoretic particles 17 by electrostatic repulsion, a dispersant (or charge-preparing agent) may be used, or the electrophoretic particles 17 may be subjected to a surface treatment, or both of such methods may be combined.

The porous layer 16 may be, for example, a three-dimensional conformation structure (an irregular network structure like a non-woven cloth) that is formed of a fibrous structure 16A, as illustrated in FIG. 3. The porous layer 16 may have a plurality of clearance gaps (fine pores H) through which the electrophoretic particles 17 pass at locations where the fibrous structures 16A are not present.

The porous layer 16 may include one or two or more of non-electrophoretic particles 16B, and non-electrophoretic particles 16B are held by the fibrous structure 16A. In the porous layer 16 that is a three-dimensional conformation structure, the single fibrous structure 16A may intertangle in a random manner, or the plurality of fibrous structures 16A may gather to overlap with one another in a random manner, or both of such structures may be mixed. When there are the plurality of fibrous structures 16A, each of the fibrous structures 16A may preferably hold one or two or more of the non-electrophoretic particles 16B. It is to be noted that FIG. 3 illustrates a case where the porous layer 16 is configured by the plurality of fibrous structures 16A.

The reason why the porous layer 16 adopts a three-dimensional conformation structure is because the optical reflectance of the porous layer 16 is improved since outside light is likely to undergo diffused reflection (multiple scattering) by virtue of an irregular conformation structure of the porous layer 16, and because an increase in thickness of the porous layer 16 is unnecessary to achieve the high optical reflectance. This leads to enhancement of the contrast, and reduction in energy necessary for allowing the electrophoretic particles 17 to migrate. Further, it is also because the electrophoretic particles 17 pass through the fine pores H more easily since the fine pore H becomes larger in an average pore diameter, and increases in number. This results in reduction in time necessary for migration of the electrophoretic particles 17, and also reduction in energy necessary for migration of the electrophoretic particles 17.

The reason why the fibrous structure 16A includes the non-electrophoretic particle 16B is because the optical reflectance of the porous layer 16 is further improved since outside light is more likely to undergo diffused reflection. This leads to enhancement of the contrast.

The fibrous structure 16A may be a fibrous substance having a sufficiently large length relative to a fiber diameter (diameter). The fibrous structure 16A may contain, for example, one kind or two or more kinds of any of a polymer material or an inorganic material, or may contain any other material. Examples of the polymer material may include nylon, polylactate, polyamide, polyimide, polyethylene terephthalate, polyacrylonitrile, polyethylene oxide, polyvinyl carbazole, polyvinyl chloride, polyurethane, polystyrene, polyvinyl alcohol, polysulfone, polyvinyl pyrrolidone, polyvinylidene fluoride, polyhexafluoropropylene, cellulose acetate, collagen, gelatin, chitosan, and copolymer thereof. Examples of the inorganic material may include titanium oxide. Above all, the polymer material may be preferable as a constituent material of the fibrous structure 16A. This is because such a material suppresses unintended decomposition reaction of the fibrous structure 16A by virtue of low reactivity (such as optical reactivity) (high chemical stability). It is to be noted that when the fibrous structure 16A is made of a material having high reactivity, a surface of the fibrous structure 16A may be preferably covered with any protective layer.

A shape (external appearance) of the fibrous structure 16A is not specifically limitative as long as it has a fibrous form having a sufficiently large length relative to a fiber diameter as described above. More specifically, the fibrous structure 16A may have a linear or kinky shape, or any shape that is folded in the middle. Further, the fibrous structure 16A may not only extend in one direction, but also diverge in one direction or two or more directions in the middle. A method of forming the fibrous structure 16A is not specifically limitative; however, it may be preferable to adopt, for example, a phase separation method, a phase reversal method, an electrostatic (electric field) spinning method, a melt-spinning method, a wet spinning method, a dry spinning method, a gel spinning method, a sol-gel method, and a spray coating method. This is because such methods facilitate to form fibrous substances having a sufficiently large length relative to a fiber diameter with ease and stability.

An average fiber diameter of the fibrous structure 16A is not specifically limitative; however, it may be as small as possible. This is because light is likely to undergo diffused reflection, and because an average pore diameter of the fine pore H becomes larger. However, the average fiber diameter may be determined to ensure that the fibrous structure 16A holds the non-electrophoretic particles 16B. Therefore, it may be preferable that the average fiber diameter of the fibrous structure 16A be 10 μm or less. It is to be noted that a lower limit of the average fiber diameter is not specifically limitative; however, it may be 0.1 μm, and may be not more than 0.1 μm, for example. The average fiber diameter may be measured through microscope observation with use of, for example, a scanning electron microscope (SEM). It is to be noted that an average length of the fibrous structure 16A may be any length.

An average pore diameter of the fine pore H is not specifically limitative; however, it may be preferably as large as possible. This is because such a diameter ensures that the electrophoretic particles 17 pass through the fine pores H more easily. Therefore, the average pore diameter of the fine pore H may be preferably within the range of 0.1 μm to 10 μm both inclusive.

A thickness of the porous layer 16 is not specifically limitative; however, it may be, for example, within the range of 5 μm to 100 μm both inclusive. This is because such a thickness ensures that the shielding property of the porous layer 16 is increased, and the electrophoretic particles 17 pass through the fine pores H more easily.

In particular, the fibrous structure 16A may be preferably made of a nanofiber. This is because the optical reflectance of the porous layer 16 is further improved since outside light is likely to undergo diffused reflection by virtue of a complicated conformation structure, and because the electrophoretic particles 17 pass through the fine pores H more easily since a proportion of a volume of the fine pore H occupied in a unit volume of the porous layer 16 becomes greater. This leads to enhancement of the contrast, and reduction in energy necessary for migration of the electrophoretic particles 17. The nanofiber may be a fibrous substance having a fiber diameter ranging from 0.01 μm to 0.1 μm both inclusive and a length of one hundred or more times greater than the fiber diameter. The fibrous structure 16A that is the nanofiber may be preferably formed by the electrostatic spinning method with use of a polymer material. This is because such a method facilitates to form the fibrous structure 16A having a small fiber diameter with ease and stability.

It may be preferable that the fibrous structure 16A have an optical reflectance property different from that of the electrophoretic particle 17. More specifically, the optical reflectance of the fibrous structure 16A is not specifically limitative; however, it may be preferably set up to ensure that the porous layer 16 shields the electrophoretic particles 17 at least as a whole. As described above, this is because the contrast is intended to be generated by utilizing a difference between the optical reflectance of the electrophoretic particle 17 and that of the porous layer 16.

The non-electrophoretic particle 16B may be a particle that is fixed to the fibrous structure 16A, and performs no electrophoretic migration. A constituent material of the non-electrophoretic particle 16B may be, for example, similar to the constituent material of the electrophoretic particle 17, and may be selected depending on a role assumed by the non-electrophoretic particle 16B as describe later. The non-electrophoretic particle 16B may have an optical reflectance property different from that of the electrophoretic particle 17. The optical reflectance of the non-electrophoretic particle 16B is not specifically limitative; however, it may be preferably set up to ensure that the porous layer 16 shields the electrophoretic particles 17 at least as a whole. As described above, this is because the contrast is intended to be generated by utilizing a difference between the optical reflectance of the electrophoretic particle 17 and that of the porous layer 16.

Here, a specific constituent material of the non-electrophoretic particle 16B may be selected depending on a role assumed by the non-electrophoretic particle 16B to generate the contrast, for example. More specifically, a material to be used when bright display is performed by the non-electrophoretic particle 16B may be similar to a material of the electrophoretic particle 17 to be selected when the bright display is performed. On the other hand, a material to be used when dark display is performed by the non-electrophoretic particle 16B may be similar to a material of the electrophoretic particle 17 to be selected when the dark display is performed. Above all, as a material to be selected when the bright display is performed by the non-electrophoretic particle 16B, a metal oxide may be preferable, and titanium oxide may be more preferable. This is because the titanium oxide has superior electrochemical stability and fixability, and achieves high reflectance. Such a constituent material of the non-electrophoretic particle 16B either may be the same, or different from a constituent material of the electrophoretic particle 17 as long as the constituent material of the non-electrophoretic particle 16B enables the contrast to be generated.

It is to be noted that the case described about a color to be visually recognized of the electrophoretic particle 17 may hold true for a color to be visually recognized when the bright display or the dark display is performed by the non-electrophoretic particle 16B.

An example of procedures of forming the porous layer 16 is as follows. First, a constituent material (for example, a polymer material) of the fibrous structure 16A is dispersed or dissolved in an organic solvent or any other liquid to prepare a spinning solution. Next, the non-electrophoretic particles 16B are added to the spinning solution, and thereafter the non-electrophoretic particles 16B are dispersed in the spinning solution by performing sufficient stirring. Finally, fiber spinning is carried out by the electrostatic spinning method with use of the spinning solution. This ensures that the non-electrophoretic particles 16B are held by the fibrous structure 16A, resulting in formation of the porous layer 16.

The second electrode 19 may be configured by, for example, a transparent electrically conductive film. Examples of a material for the transparent electrically conductive film may include indium oxide-tin oxide (ITO), antimony oxide-tin oxide (ATO), fluorine-doped tin oxide (FTO), and aluminum-doped zinc oxide (AZO). Here, for example, the second electrode 19 may be provided on surface side of the second substrate 20 as the electrode common to all of the pixels 10a; however, it may be segmented in the same manner as the first electrode 13 (a plurality of second electrodes 19 may be provided). The display drive may be carried out while the second electrode 19 is held at a reference potential (common potential Vcom) common to each of the pixels 10. Further, as described later, a configuration may be made such that the common potential Vcom is offset during a predetermined image write operation.

The second substrate 20 may be made of a material similar to a material to be used for the first substrate 11. However, since images are displayed on a top surface of the second substrate 20, a material having light-transmissivity may be used for the second substrate 20. On one surface of the second substrate 20, an unillustrated color filter may be provided, or color particles other than white and black particles may be used.

[Drive Method]

The display unit 1 according to the present embodiment may generate the contrast utilizing, for example, a difference between the optical reflectance of the electrophoretic particles 17 and that of the porous layer 16 as described above by performing voltage-drive of the pixel section 1A for each of the pixels 10, thereby making it possible to carry out bright display (white display), dark display (black display), or gray-scale display. More specifically, a display-use voltage (potential Vs) may be applied to the first electrode 13 through the signal line DL, while holding the second electrode 19 at the common potential Vcom, thereby allowing a voltage of the display element 10A to be applied, depending on a potential difference that is generated between the first electrode 13 and the second electrode 19. The electrophoretic particles 17 may migrate between the first electrode 13 and the second electrode 19 depending on a magnitude of such an applied voltage and the polarity thereof. As a result, the white, black, or gray-scale display status as described above may be switched for each of the pixels 10 in such a manner that the optical reflectance for each of the pixels 10 is varied by utilizing, for example, either one or both of the light reflection property of the electrophoretic particles 17 and that of the porous layer 16. This allows images to be displayed on the pixel section 1A.

FIG. 4 schematically illustrates an example of display operation of the display unit 1. As seen from the diagram, for example, a positive-polarity potential (+15 V as an example here) or a negative-polarity potential (−15 V as an example here) may be applied to each of the first electrodes 13, while holding the second electrode 19 at the common potential Vcom (for example, 0 V). Alternatively, 0 V may be applied to the first electrode 13. Consequently, a potential difference may be generated between the first electrode 13 and the second electrode 19 for each of the pixels 10, and a positive-polarity voltage, a negative-polarity voltage, or a 0 V voltage may be applied to the display element 10A. As a result, the electrophoretic particles 17 that are positively or negatively charged (negatively charged, for example, here) may migrate to first electrode 13 side or second electrode 19 side.

In this example, in the pixel 10 where +15 V is applied to the first electrode 13, the electrophoretic particles 17 may be shielded by the porous layer 16 by migration of the electrophoretic particles 17 to first electrode 13 side. In other words, the optical reflectance of the porous layer 16 may become dominant, leading to a display state (to be hereinafter described as a white display state as an example) that corresponds to the optical reflectance of the porous layer 16. Meanwhile, in the pixel 10 where −15 V is applied to the first electrode 13, the electrophoretic particles 17 may be exposed from the porous layer 16 by migration of the electrophoretic particles 17 to second electrode 19 side. In other words, the optical reflectance of the electrophoretic particles 17 may become dominant, leading to a display state (to be hereinafter described as a black display state as an example) that corresponds to the optical reflectance of the electrophoretic particles 17. It is to be noted that a reason for application of 0 V is described later.

However, the display unit 1 of an electrophoresis type may have a property in which the optical reflectance varies on a time-series basis depending on the optical response property of the display element 10A at the time of transition from white display to black display, or from black display to white display. It may be preferable to drive a voltage in consideration of such a time-series variation in the optical reflectance. In other words, to achieve a desired display state, an applied voltage waveform (for example, a voltage application time period and timing) may be set up by defining a period corresponding to several frames to several tens of frames, for example (hereinafter referred to as a "write period") as a unit period of image display or image rewrite. Further, it may be effective to apply 0 V on a predetermined timing basis during the write period. In such a manner, the drive operation is carried out that ensures that a desired display state is achieved at the end of one write period by properly setting a voltage application time period and timing. Hereinafter, the description is given of the case of transition (switching) from black display to white display as an example of this drive operation.

[Basic Display Drive Operation: Gray-Scale Display]

First, basic display drive operation of the display unit 1 is described with reference to FIGS. 4, 5A, and 5B. It is to be noted that, in FIG. 5A, (Vs) denotes a waveform of a voltage to be applied to the signal line DL, and (Vg1), (Vg2), . . . , (Vgn) denote waveforms of voltages to be applied to the first to the n-th scanning lines GL, respectively. Further, in the present specification, a single frame period (1H) is defined to include a scanning period $H_V$ (a time period necessary for scanning all the scanning lines GL in a line-sequential manner) and a vertical blanking period $H_{BL}$. A frame frequency may be, for example, 40 Hz to 100 Hz both inclusive, and a single frame period H may be, for example, 10 ms to 25 ms (milliseconds) both inclusive. Further, the vertical blanking period $H_{BL}$ may be set to be about 0.1 ms to 4 ms both inclusive, for example. It is to be noted that, in the present specification, a waveform observed in a case where an n-type TFT device is used is illustrated as an example of a waveform of a voltage to be applied to the scanning line GL. When a p-type TFT device is used, a waveform of an on/off switching voltage is reversed to the illustrated waveform.

In such a manner, during a single frame period H (No. 9 frame in this example), a potential Vsig may be applied to the signal line DL, while an on potential Von may be applied to each of the scanning lines GL in a line-sequential manner. As a result, in the selected pixel 10, a display-use voltage depending on the potential Vsig may be applied to the display element 10A through the TFT device. More particularly, the TFT device in the first-line pixel 10 may be turned on in such a manner that the on potential Von is applied to the first scanning line GL, for example. Thereafter, the potential Vsig of the signal line DL at that time may be selected to be applied to the first electrode 13. Meanwhile, the second electrode 19 may be held at the common potential Vcom. Consequently, a voltage depending on a potential difference between the first electrode 13 and the second electrode 19 may be applied to the display element 10A, and such an applied voltage may be held by a capacitance component that is formed in the pixel 10 even after the TFT device is turned off (even after an off potential Voff is applied). Such an operation may be performed for each of the pixels 10, and the electrophoretic display device may be driven for each of the pixels 10 by the voltage (equivalent to a potential difference between the first electrode 13 and the second electrode 19) that is held by the capacitance component. In each of the pixels 10, the electrophoretic particles 17 may migrate between the electrodes as described above depending on the applied voltage, resulting in variations in the optical reflectance. Such voltage drive operation may be performed consecutively over a plurality of frames.

As an example, FIG. 5B schematically illustrates a waveform of a voltage to be applied to the display element 10A and a corresponding optical response waveform (a change over time in the optical reflectance). For example, as illustrated in a voltage waveform V11, when drive operation is performed in which positive-polarity voltages are applied consecutively in frames 1 to 4, and thereafter negative-polarity voltages are applied consecutively in frames 5 to 12, the optical response property of the display element 10A may exhibit a waveform S11, for example. In other words, the optical reflectance may increase (rise) gradually over a period from a start time point of the frame 1 to an end time point of the frame 4, resulting in transition from a black display state to a white display state. Further, the optical reflectance may decrease (fall) gradually over a period from a start time point of the frame 5 to an end time point of the frame 12, resulting in transition from a white display state to a black display state.

On the contrary, as illustrated in a voltage waveform V12, an applied voltage may be varied little by little. For example, positive-polarity voltages may be applied consecutively in frames (n−6) and (n−5), and thereafter 0 V may be applied in frames (n−4) and (n−3). Afterward, negative-polarity voltages may be applied consecutively in frames (n−2) and (n−1), and 0 V may be applied again in a final frame (n). When such a drive is performed, the optical response property of the display element 10A may exhibit a waveform S12, for example. In other words, the optical reflectance may increase gradually over a period from a start time point of the frame (n−6) to an end time point of the frame (n−5), resulting in transition from a gray-scale display state to a white display state, for example. Further, a display state (white display state) in the frame immediately prior to may be kept over a period from a start time point of the frame (n−4) to an end time point of the frame (n−3). Thereafter, the optical reflectance may decrease gradually over a period from a start time point of the frame (n−2) to an end time point of the frame (n−1), resulting in transition from a white display state to a gray-scale display state. In the frame (n), a display state (gray-scale display state) in the frame immediately prior to may be kept.

FIG. 6 illustrates an image of a gradation change in frames relative to an applied voltage as describe above. In such a manner, as a voltage waveform V13, for example, positive-polarity voltages may be applied consecutively during a period Ti corresponding to frames 1 to 9, and thereafter negative-polarity voltages may be applied consecutively during a period T2 corresponding to frames 10 and 11. Subsequently, 0 V may be applied during a period T3 corresponding to a frame 12, and thereafter a negative-polarity voltage may be applied during a period T4 corresponding to a frame 13. In this case, a gradation change as schematically illustrated may occur in the frames 1 to 13. This allows the gray-scale display in a frame unit to be achieved in a pulse width modulation (PMW) method.

As mentioned above, at the time of image display or image switching in the pixel section 1A including the display element 10A (electrophoretic display device), a voltage waveform combining a positive-polarity voltage, a negative-polarity voltage, and 0 V may be set up in accordance with the optical response property of the display element 10A for each write period. In the example described here, it is possible to switch a display toward a white display state by applying the positive-polarity voltage, and to switch a display toward a black display state by applying the negative-polarity voltage.

[Effects of Applied Voltage of 0 V]

Further, by combining applied voltage of 0 V in addition to the positive-polarity voltage and the negative-polarity voltage, more elaborated gray-scale display is achievable. As an example, each of FIGS. 7A to 7D illustrates a voltage waveform at the time of switching from a black display state to a white display state or a low-gradation state. In an example in FIG. 7A, the positive-polarity voltage may be applied in full frame (for example, 500 ms) of a single write period W. Such a voltage application makes it possible to make a switchover from a maximum black display state (full black display state) to a maximum white display state (full white display state). In an example in FIG. 7B, the positive-polarity voltage may be applied during a first half period T5 in the single write period W, and 0 V may be applied during a subsequent period T6 (for example, T5<T6). In an example in FIG. 7C, the positive-polarity voltages may be applied in intermittent frames in the single write period W, and 0 V may be applied in other frames (the positive-polarity voltages and 0 V may be applied repeatedly and alternately). In an example in FIG. 7D, the positive-polarity voltage may be applied during a first half period T7 in the single write period W, and the negative-polarity voltage may be applied during a subsequent period T8 (for example, T7>T8). In any of the examples illustrated in FIGS. 7B to 7D, it is possible to make a switchover from the full black state to the low-gradation state. As described above, there may be a plurality of patterns of applied voltage waveforms for the gray-scale display, and the patters are not limited to those illustrated.

Further, the following advantages are obtained by applying 0 V in the final frame of the write period. FIG. 8A illustrates voltage waveforms Vg and Vs observed when 0 V is applied in a final frame $f_{EN}$ of the write period W, and a waveform S21 of the optical response property of the display element 10A relative to the applied voltage. In addition, as a comparative example, FIG. 8B illustrates the voltage waveforms Vg and Vs observed when 0 V is not applied in the final frame $f_{EN}$ of the write period W, and a waveform S22 of the optical response property of the display element 10A relative to the applied voltage. It is to be noted that charged voltages held by the capacitance component (Cs) of the pixel 10 are denoted with oblique lines in FIGS. 8A and 8B. In the comparative example illustrated in FIG. 8B, a voltage that has been applied in a frame immediately prior to the final frame $f_{EN}$ may remain in the capacitance component Cs. Therefore, a voltage may continue to be applied to the display element 10A, leading to a continued increase in the optical reflectance. This may make it difficult to achieve the desired optical reflectance. On the contrary, when 0 V is applied to the final frame $f_{EN}$ as illustrated in FIG. 8A, the capacitance component Cs is discharged in the final frame $f_{EN}$, and the optical reflectance at an end time point of the frame immediately prior to the final frame $f_{EN}$ is maintained. This makes it easy to achieve the desired optical reflectance. That is, the gradation control on the basis of applied voltage x time is facilitated. As described above, in the voltage drive with use of the TFT device, it may be preferable to apply 0 V in the final frame of the write period W.

Further, even in the following case, the applied voltage of 0 V is effective. Each of FIGS. 9A and 9B schematically illustrates operation of rewriting a display image at a portion of a display screen (partial rewrite operation). An example in FIG. 9A is an example where 0 V is not used. In this example, even when an image at only a partial region D1 of a display screen D0 is changed, scanning may be performed on a full screen including a region D2 where no image is changed, and a positive-polarity voltage or a negative-polarity voltage may be applied to all of the pixels 10. On the contrary, in an example illustrated in FIG. 9B, the positive-polarity voltage or the negative-polarity voltage is applied in only the region D1 of the display screen D0, and 0 V is applied to the region D2. Such a use of 0 V during the partial rewrite operation leads to reduction in the power consumption and reduction in the visual stimulus. Therefore, the display element 10A may preferably have characteristics (memory performance) ensuring that the optical response property does not vary even during application of 0 V.

Moreover, the display unit 1 of the electrophoresis type may be used in such a manner that power is turned off upon completion of write operation of one image, and thereafter power is turned on again when new rewrite operation is performed. In other words, in the electrophoretic display device, since supply of voltages to the pixels 10 is once stopped after write operation, it is likely that the reflectance (luminance) may deteriorate after the write operation. To correct such deterioration in the luminance, gradation adjustment may be also performed in some cases after switchover between white and black is made. Further, writing of a white display and a black display on a whole screen may provide a feeling of discomfort to a user, and therefore it may be preferable that the number of write regions be as small as possible. More specifically, in such a manner that the rewrite operation (new write operation) is not performed on a portion where the same image is displayed over a plurality of write periods in the whole display screen, it is possible to significantly reduce the feeling of discomfort of a user when an image with many background regions as described hereinafter is outputted.

[Common Potential Offset Operation During Partial Rewrite]

At the time of the partial rewrite operation as described above, an image at a partial region (second region) may be rewritten in some cases, with a white or black display state held at a background part (first region), for example, in an image to be displayed by the pixel section 1A. Hereinafter, the description is given of an example of the display drive operation in such a case.

FIG. 10A schematically illustrates an example of an image (clock image) to be displayed after a predetermined write period (write period W1: first write period). In this example, a background part 31 occupying a large portion of a display screen 30 (pixel section 1A) may be brought into a white display state, for example. A graphic part 32 representing the outer circumference of the clock, as well as a minute hand and an hour hand may be brought into a black display state, for example.

The description is given of a case where such a clock image may be displayed during the write period W1, and an image representing a clock hand (a minute hand in this example) being moved after elapsed time of one minute may be displayed in a temporally-continuous write period (write period W2: second write period) during the write period W1.

FIG. 10B is a schematic diagram for describing a display rewrite operation according to a comparative example. As illustrated, when an image representing, for example, only the minute hand being moved is displayed during the write period W2, for example, the background part 31 and a portion 102a of the graphic part 32 (for example, a portion corresponding to the outer circumference and the hour hand of the clock) may not be rewritten, and a display state of a portion corresponding to the minute hand at the graphic part 32 may be changed. At this time, a portion (erasure portion 102b) where the minute hand was displayed during the write period W1 may be rewritten from the black display state to the white display state. On the contrary, a white display portion (a write portion 102c) that was a portion of the background part 31 during the write period W1 may be rewritten from the white display state to the black display state. For the above-described reason, at the background part 31 other than the write portion 102c, new write operation may not be performed, and the white display state may be maintained.

However, as mentioned above, in the electrophoretic display device, power may be turned off once for each write operation, and the optical reflectance relative to an applied voltage may vary on a time-series basis (depending on elapsed time). This may result in a difference in the optical reflectance between the erasure portion 102b to which a voltage for white display is newly applied during the write period W2 and the background part 31 that remains in the white display state by a voltage applied prior to the write period W2, which may cause a difference in the luminance. More specifically, the optical reflectance of the background part 31 may be lower than that of the erasure portion 102b, leading to deterioration in the luminance. Such a difference in the luminance may cause a residual image to be visually recognized.

Accordingly, in the present embodiment, during the partial rewrite operation as described above, drive operation may be performed that offsets the common potential Vcom depending on a display state (white or black display state) of the background part 31 at the time of switching from the write period W1 to the write period W2, as illustrated in FIGS. 11A and 11B. More specifically, at first, the driver 2 may identify a display state of the background part 31 to offset the common potential Vcom toward a direction of switching (transitioning) to the identified display state. In other words, the common potential Vcom may be shifted to raise a voltage held at the background part 31. For example, when the background part 31 is held in the white display state, the common potential Vcom may be offset toward a white display direction (negative side in a case where the black electrophoretic particles 17 are negatively-charged) (FIG. 11C).

This suppresses deterioration in the optical reflectance of the background part 31, as schematically illustrated in FIG. 11B. Thus, during the write period W2, a difference in the luminance is reduced between the background part 31 and an erasure portion 32b to which write operation is performed from the black display state to the white display state, which makes it possible to reduce occurrence of a residual image as observed in the above-described comparative example. Further, it is possible to achieve image display with a high contrast ratio. It is to be noted that a write portion 32c may be a portion corresponding to a portion of the background part 31 during the write period W1 similarly to the write portion 102c in the above-described comparative example, and may be rewritten from the white display state to the black display state during the write period W2. Each of the erasure portion 32b and the write portion 32c corresponds to a specific example of a "second region" in the disclosure.

The offset amount of the common potential Vcom may be set as appropriate depending on the optical response property and memory performance of the display element 10A; however, it may be preferably set at less than 5 V, for example. FIG. 12 illustrates an example of a change in the reflectance over time. As illustrated, a change in the reflectance after elapsed time of ten minutes may be preferably within 1%. The offset amount in this case may be set at about 1 V to 4 V, for example. Further, when storage over a long period time is taken into account, a change in the reflectance after elapsed time of ten minutes may be preferably within 0.5%. Such characteristics may be different depending on the display element 10A; however, the offset amount may be preferably set at less than 5 V.

[Settings of Termination Voltage during Write period W2]

When offset drive of the common potential Vcom is performed, the desired optical reflectance may be achieved for a white display region (a region in a same display state as the background part 31) as described above, but the characteristics may deteriorate conversely for a black display region (a region in a different display state from the background part 31). As schematically illustrated in FIG. 11B, a color of the graphic part 32 (the portion 32a including the outer circumference and an hour hand portion, and the write portion 32c (minute hand portion)) may be paled out. It is to be noted that, on the contrary, when the background part 31 is in the black display state, the property of holding the white display may become unstable because the common potential Vcom is offset toward a direction of stabilizing the black display.

Here, the description is given of drive operation in a final frame of the write period W2. In the final frame of the write period W2, a TFT device 12A may be turned off under the condition where the common potential Vcom is set at 0 V, and a source potential (potential at a position P1) is set at 0 V, as illustrated in FIG. 13A. In this case, after the potential (source potential Vs) of the signal line DL is first dropped down to a reference potential, the common potential Vcom may be returned back to 0 V, and finally the TFT device 12A may be switched to an off-state (the potential Vg of the scanning line GL is dropped down to off potential), as illustrated in FIG. 13B. In such a manner, the write period W2 may be completed.

To stabilize the graphic part 32 (the outer circumference, the hour hand portion, and the write portion 32c) in the black display state in the final frame of the write period W2, the following drive operation may be preferably performed in each of the background part 31 remaining in the white display state and the graphic part 32 remaining in the black display state.

[Drive Example 1]

The description is given of a drive example where the TFT device is turned off with the common potential Vcom held at a post-offset potential, for example. Each of FIGS. 14A and 14B is a diagram for describing a potential state at the end of the write period W2 in the background part 31 (white display region). Each of FIGS. 15A and 15B is a diagram for describing a potential state at the end of the write period W2 in the graphic part 32 (black display region). As illustrated in FIGS. 14A and 14B, in the background part 31, in the final frame of the write period W2, the source potential may be dropped down to 0 V, and thereafter the TFT device may be turned off with a potential (for example, −2 V) of the common potential Vcom maintained. On the contrary, as illustrated in FIGS. 15A and 15B, in the graphic part 32, in the final frame of the write period W2, a potential (for example, −2 V) that cancels (compensates) at least a portion of the offset amount of the common potential Vcom may be applied to the first electrode 13 as the source potential Vs, and thereafter the TFT device may be turned off. At this time, the common potential Vcom may be held to remain at a post-offset potential (for example, −2 V). It is to be noted that the potential (potential at the position P1) to be applied to the first electrode 13 in the graphic part 32 is not limited specifically, and may be a potential such as −15 V, for example, that generates a potential difference in a direction opposite to the background part 31.

[Drive Example 2]

Alternatively, the TFT device may be turned off after the common potential Vcom is returned back to 0 V. Each of FIGS. 16A and 16B is a diagram for describing a potential state at the end of the write period W2 in the background part 31 (white display region). Each of FIGS. 17A and 17B is a diagram for describing a potential state at the end of the write period W2 in the graphic part 32 (black display region). As illustrated in FIGS. 16A and 16B, in the background part 31, in the final frame of the write period W2, the common potential Vcom may be returned back to 0 V, and a potential (for example, +2 V, +15 V) that generates a potential difference equal to or greater than a potential at the time of offsetting the common potential Vcom may be applied to the first electrode 13 as the source potential Vs. Thereafter, the TFT device may be turned off. On the contrary, as illustrated in FIGS. 17A and 17B, in the graphic part 32, after the source potential Vs is dropped down to 0 V, the common potential Vcom may be returned back to 0 V, and finally the TFT device 12A may be switched to an off-state, as with the case of FIGS. 13A and 13B.

[Setting Examples of Write Time and Applied Voltage Waveform]

As describe above, when partial image rewrite operation is performed during the write period W2, the drive may be carried out to rewrite the erasure portion 32b and the write portion 32c (to make a switchover of the display state from white to black, or from black to white), as illustrated in FIG. 11B. At this time, the display state is switched from black to white in the erasure portion 32b, and therefore a color may be almost equivalent to that of the background part 31. Therefore, the erasure portion 32b may involve less necessity for considering an elapsed time. On the contrary, the display state is switched from white to black in the write portion 32c. This may result in DC balance at the white display time being significantly shifted.

Accordingly, a time length of the write period W2 may be changed depending on a duration time of a white display state in a region corresponding to the write portion 32c immediately prior to the write period W2 (prior to update or rewrite). FIG. 18 illustrates such an example. For example, when the update (rewrite) is performed ten minutes later (a duration time of the white display state is ten minutes), the write period W2 may be set at a time length equivalent to 11 frames. Further, when the update is performed 30 minutes later (a duration time of the white display state is 30 minutes), the write period W2 may be set at a time length equivalent to 14 frames. Alternatively, when the update is performed one hour later (a duration time of the white display state is one hour), the write period W2 may be set at a time length equivalent to 25 frames.

As an alternative, an applied voltage waveform may be changed depending on a duration time of a white display state in a region corresponding to the write portion 32c immediately prior to the write period W2 (prior to update or rewrite). FIG. 19 illustrates such an example. For example, when the update is performed ten minutes later (a duration time of the white display state is ten minutes), a voltage waveform may be set up in such a manner that flushing is performed two times (display switchover from black to white, or from white to black is performed two times) during the write period W2. Further, when the update is performed 30 minutes later (a duration time of the white display state is 30 minutes), a voltage waveform may be set up in such a manner that flushing is performed three times (display switchover from black to white, or from white to black is performed three times) during the write period W2. Alternatively, when the update is performed one hour later (a duration time of the white display state is one hour), a voltage waveform may be set up in such a manner that flushing is performed five times (display switchover from black to white, or from white to black is performed five times) during the write period W2.

In such a manner, regarding the rewrite of the write portion 32c, by setting a time length of the write period W2 and the applied voltage waveform depending on an update time, it is possible to suppress a variation in the black display after rewriting. Further, this makes it possible to suppress a variation in color (white display) of the background part 31, and thus the effect of suppressing residual images is also expectable.

Alternatively, DC balance may be corrected by signal processing depending on a time length of the write period W2 and the offset amount of the common potential Vcom.

As described thus far, in the present embodiment, in the pixel section 1A having the electrophoretic display device, the white, black, or gray-scale display state may be switched depending on voltages applied through the plurality of first electrodes 13 and the second electrode 19. At this time, during a write period including a single frame period or a plurality of frame periods, by varying a display-use voltage (source potential Vs) to be applied to the first electrode 13, while holding the second electrode 19 at a common potential (Vcom), the display state may be switched, resulting in the image being switched (the image being updated). When the first region (for example, a region corresponding to the background part 31) in the pixel section 1A has the white display state during the write period W1, and an image of the second region (for example, a region corresponding to the erasure portion 32b and the write portion 32c) in the pixel section 1A is changed while holding the white display state in the background part 31 at the time of switchover from the write period W1 to the temporally-continued write period W2, the common potential may be offset toward a direction of raising a voltage (white display-use voltage) to be applied to the background part 31. This makes it possible to correct a change in the reflectance over time in the background part 31, thereby allowing for suppression of generation of residual images, and suppression of deterioration in the contrast ratio. As a result, it is possible to improve the display performance.

Hereinafter, the description is given of a modification example of the above-described embodiment. Hereinafter, the same reference numeral is assigned to the same component in the above-described embodiment, and description therefor is omitted where appropriate.

Modification Example

FIG. 20 illustrates a configuration of a key part of a display unit according to a modification example of the above-described embodiment. The above-described embodiment describes a configuration example in a case where the display drive is performed in the active-matrix drive method with use of the TFT devices. However, the display unit and the drive method of the disclosure are also applicable to any drive method with no use of the TFT devices. Examples of such drive methods may include a passive-matrix drive method and a segment drive method. In this case, a plurality of first electrodes 13 may be provided on a substrate 11, and those first electrodes 13 may be covered with a sealing layer 14, as illustrated in FIG. 20. On the sealing layer 14, a display element 10A, a second electrode 19, and a second substrate 20 may be disposed, as with the above-described first embodiment. Further, the display element 10A may be divided into a plurality of regions by a bulkhead 18.

In the present modification example as well, a voltage corresponding to the source potential Vs may be applied to the first electrode 13, and the second electrode 19 may be held at a common potential Vcom, thereby allowing a voltage corresponding to such a potential difference to be applied to the display element 10A. As a result, in the display element 10A, the optical reflectance may vary on a time-series basis depending on the applied voltage, leading to the white display, black display, and gray-scale display being carried out. At this time, when the partial rewrite operation is performed, at the time of switchover from the write period W1 to the write period W2, the common potential Vcom may be offset toward a predetermined direction, thereby allowing for suppression of a change in the optical reflectance of a background part, and suppression of deterioration in the contrast ratio, as with the above-described embodiment. Consequently, it is possible to obtain effects substantially equivalent to those of the above-described embodiment.

Application Example

Next, the description is given of an application example of any of the display units mentioned in the above-described embodiment and modification example thereof. However, a configuration of an electronic apparatus to be hereinafter described is merely exemplified, and the configuration may be changed as appropriate.

Each of FIGS. 21A and 21B illustrates an external appearance configuration of an electronic book (electronic book 3) according to an application example. The electronic book 3 may include, for example, a display section 810 and a non-display section (casing) 820, as well as an operating section 830. It is to be noted that the operating section 830 either may be provided at the front of the non-display section 820 as illustrated in FIG. 21A, or may be provided on the top surface as illustrated in FIG. 21B.

The disclosure is described thus far with reference to the embodiment; however, the disclosure is not limited to the aspects mentioned in the embodiment, but various modifications may be made. For example, the display unit of the disclosure may be applied to electronic apparatuses other than the above-described electronic apparatus. It is to be noted that the effects described in the above-described embodiment, modification example, and application example are mere examples, and the effects of the disclosure may be other different effects, or may further include other effects.

It is to be noted that the disclosure may also have the following configurations.

(1)

A display unit including:

a display section having an electrophoretic display device that is provided among a plurality of first electrodes and a second electrode, the electrophoretic display device allowing an image to be displayed by switching a white, black, or gray-scale display state depending on an applied voltage; and a drive circuit that performs display-drive of the display section by varying a voltage to be applied to the first electrodes, while holding the second electrode at a common potential during a write period including a single frame period or a plurality of frame periods, wherein, when a first region of the display section has a first display state of white or black during a first write period, and an image of a second region of the display section is changed while holding the first display state at the first region of the display section upon switchover from the first write period to a temporally-continued second write period, the drive circuit is configured to offset the common potential toward a direction in which a voltage held at the first region of the display section is raised.

(2)

The display unit according to (1), wherein the second region has a second display state that is different from the first display state during the first write period, and the drive circuit changes the second region into the first display state while holding the first region of the display section in the first display state during the second write period.

(3)

The display unit according to (1) or (2), further including a TFT device coupled to each of the plurality of first electrodes), wherein the drive circuit applies a voltage that cancels at least a portion of an offset amount of the common potential to the first electrode at a region having a second display state that is different from the first display state in the display section, while holding the common potential at a potential after the offsetting, followed by switching of the TFT device to an off-state, during a final frame period of the second write period.

(4)

The display unit according to (1) or (2), further including a TFT device coupled to each of the plurality of first electrodes), wherein the drive circuit switches the common potential to a potential prior to the offsetting, and applies a voltage that generates a potential difference equal to or greater than a potential difference in offsetting the common potential to the first electrode at a region having the first display state in the display section, followed by switching of the TFT device to an off-state, during a final frame period of the second write period.

(5)

The display unit according to any one of (1) to (4), wherein an offset amount of the common potential is less than 5 V.

(6)

The display unit according to (1), wherein the drive circuit changes a portion of the first region as the second region into a second display state that is different from the first display state, while holding the first region of the display section in the first display state during the second write period.

(7)

The display unit according to (6), wherein the drive circuit changes a time length of the second write period depending on a duration time of the first display state immediately prior to the second write period.

(8)

The display unit according to (6) or (7), wherein the drive circuit changes a waveform of a voltage applied to the second region during the second write period depending on a duration time of the first display state immediately prior to the second write period.

(9)

The display unit according to any one of (6) to (8), wherein the drive circuit corrects DC balance depending on a time length of the second write period and an offset amount of the common potential.

(10)

The display unit according to any one of (1) to (9), wherein the first display state is a white display state, and the second display state is a black display state.

(11)

A drive method including:

performing display-drive of a display section having an electrophoretic display device that is provided among a plurality of first electrodes and a second electrode, the electrophoretic display device allowing an image to be displayed by switching a white, black, or gray-scale display state, by varying a voltage to be applied to the first electrodes, while holding the second electrode at a common potential during a write period including a single frame period or a plurality of frame periods; and offsetting the common potential toward a direction in which a voltage applied to a first region of the display section is raised when the first region of the display section has a first display state of white or black during a first write period, and an image of a second region of the display section is changed while holding the first display state at the first region of the display section upon switchover from the first write period to a temporally-continued second write period.

(12)

The drive method according to (11), wherein, when the second region has a second display state that is different from the first display state during the first write period, the second region is changed into the first display state, while the first region of the display section is held in the first display state during the second write period.

(13)

The drive method according to (11) or (12), wherein a voltage that cancels at least a portion of an offset amount of the common potential is applied to the first electrode at a region having a second display state that is different from the first display state in the display section, while the common potential is held at a potential after the offsetting, followed by switching of a TFT device coupled to each of the plurality of first electrodes to an off-state, during a final frame period of the second write period.

(14)

The drive method according to (11) or (12), wherein the common potential is switched to a potential prior to the offsetting, and a voltage that generates a potential difference equal to or greater than a potential difference in offsetting the common potential is applied to the first electrode at a region having the first display state in the display section, followed by switching of a TFT device coupled to each of the plurality of first electrodes to an off-state, during a final frame period of the second write period.

(15)

The drive method according to any one of (11) to (14), wherein an offset amount of the common potential is less than 5 V.

(16)

The drive method according to (11), wherein a portion of the first region as the second region is changed into a second display state that is different from the first display state, while the first region of the display section is held in the first display state during the second write period.

(17)

The drive method according to (16), wherein a time length of the second write period is changed depending on a duration time of the first display state immediately prior to the second write period.

(18)

The drive method according to (16) or (17), wherein a waveform of a voltage applied to the second region during the second write period is changed depending on a duration time of the first display state immediately prior to the second write period.

(19)

The drive method according to any one of (16) to (18), wherein DC balance is corrected depending on a time length of the second write period and an offset amount of the common potential.

(20)

An electronic apparatus with a display unit, the display unit including: a display section having an electrophoretic display device that is provided among a plurality of first electrodes and a second electrode, the electrophoretic display device allowing an image to be displayed by switching a white, black, or gray-scale display state depending on an applied voltage; and a drive circuit that performs display-drive of the display section by varying a voltage to be applied to the first electrodes, while holding the second electrode at a common potential during a write period including a single frame period or a plurality of frame periods, wherein, when a first region of the display section has a first display state of white or black during a first write period, and an image of a second region of the display section is changed while holding the first display state at the first region of the display section upon switchover from the first write period to a temporally-continued second write period, the drive circuit is configured to offset the common potential toward a direction in which a voltage applied to the first region of the display section is raised.

This application is based upon and claims the benefit of priority of the Japanese Patent Application No. 2014-238541 filed with the Japan Patent Office on Nov. 26, 2014, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A display unit comprising:
a display section having an electrophoretic display device that is provided among a plurality of first electrodes and a second electrode, the electrophoretic display device allowing an image to be displayed by switching a white, black, or gray-scale display state depending on an applied voltage; and a drive circuit that performs display-drive of the display section by varying a voltage to be applied to the first electrodes, while holding the second electrode at a common potential during a write period including a single frame period or a plurality of frame periods, wherein, when a first region of the display section has a first display state of white or black during a first write period, and an image of a second region of the display section is changed while holding the first display state at the first region of the display section upon switchover from the first write period to a temporally-continued second write period, the drive circuit is configured to offset the common potential toward a direction in which a voltage held at the first region of the display section is raised.

2. The display unit according to claim 1, wherein
the second region has a second display state that is different from the first display state during the first write period, and the drive circuit changes the second region into the first display state while holding the first region of the display section in the first display state during the second write period.

3. The display unit according to claim 1, further comprising a TFT device coupled to each of the plurality of first electrodes, wherein the drive circuit applies a voltage that cancels at least a portion of an offset amount of the common potential to the first electrode at a region having a second display state that is different from the first display state in the display section, while holding the common potential at a potential after the offsetting, followed by switching of the TFT device to an off-state, during a final frame period of the second write period.

4. The display unit according to claim 1, further comprising a TFT device coupled to each of the plurality of first electrodes, wherein the drive circuit switches the common potential to a potential prior to the offsetting, and applies a voltage that generates a potential difference equal to or greater than a potential difference in offsetting the common potential to the first electrode at a region having the first display state in the display section, followed by switching of the TFT device to an off-state, during a final frame period of the second write period.

5. The display unit according to claim 1, wherein an offset amount of the common potential is less than 5 V.

6. The display unit according to claim 1, wherein the drive circuit changes a portion of the first region as the second region into a second display state that is different from the first display state, while holding the first region of the display section in the first display state during the second write period.

7. The display unit according to claim 6, wherein the drive circuit changes a time length of the second write period depending on a duration time of the first display state immediately prior to the second write period.

8. The display unit according to claim 6, wherein the drive circuit changes a waveform of a voltage applied to the second region during the second write period depending on a duration time of the first display state immediately prior to the second write period.

9. The display unit according to claim 6, wherein the drive circuit corrects DC balance depending on a time length of the second write period and an offset amount of the common potential.

10. The display unit according to claim 1, wherein the first display state is a white display state, and the second display state is a black display state.

11. A drive method comprising:
performing display-drive of a display section having an electrophoretic display device that is provided among a plurality of first electrodes and a second electrode, the electrophoretic display device allowing an image to be displayed by switching a white, black, or gray-scale display state, by varying a voltage to be applied to the first electrodes, while holding the second electrode at a common potential during a write period including a single frame period or a plurality of frame periods; and
offsetting the common potential toward a direction in which a voltage applied to a first region of the display section is raised when the first region of the display section has a first display state of white or black during a first write period, and an image of a second region of the display section is changed while holding the first display state at the first region of the display section upon switchover from the first write period to a temporally-continued second write period.

12. The drive method according to claim 11, wherein, when the second region has a second display state that is different from the first display state during the first write period, the second region is changed into the first display state, while the first region of the display section is held in the first display state during the second write period.

13. The drive method according to claim 11, wherein a voltage that cancels at least a portion of an offset amount of the common potential is applied to the first electrode at a region having a second display state that is different from the first display state in the display section, while the common potential is held at a potential after the offsetting, followed by switching of a TFT device coupled to each of the plurality of first electrodes to an off-state, during a final frame period of the second write period.

14. The drive method according to claim 11, wherein the common potential is switched to a potential prior to the offsetting, and a voltage that generates a potential difference equal to or greater than a potential difference in offsetting the common potential is applied to the first electrode at a region having the first display state in the display section, followed by switching of a TFT device coupled to each of the plurality of first electrodes to an off-state, during a final frame period of the second write period.

15. The drive method according to claim 11, wherein an offset amount of the common potential is less than 5 V.

16. The drive method according to claim 11, wherein a portion of the first region as the second region is changed into a second display state that is different from the first display state, while the first region of the display section is held in the first display state during the second write period.

17. The drive method according to claim 16, wherein a time length of the second write period is changed depending on a duration time of the first display state immediately prior to the second write period.

18. The drive method according to claim 16, wherein a waveform of a voltage applied to the second region during the second write period is changed depending on a duration time of the first display state immediately prior to the second write period.

19. The drive method according to claim 16, wherein DC balance is corrected depending on a time length of the second write period and an offset amount of the common potential.

20. An electronic apparatus with a display unit, the display unit comprising:
a display section having an electrophoretic display device that is provided among a plurality of first electrodes and a second electrode, the electrophoretic display device allowing an image to be displayed by switching a white, black, or gray-scale display state depending on an applied voltage; and
a drive circuit that performs display-drive of the display section by varying a voltage to be applied to the first electrodes, while holding the second electrode at a common potential during a write period including a single frame period or a plurality of frame periods,
wherein, when a first region of the display section has a first display state of white or black during a first write period, and an image of a second region of the display section is changed while holding the first display state at the first region of the display section upon switchover from the first write period to a temporally-continued second write period, the drive circuit is configured to offset the common potential toward a direction in which a voltage applied to the first region of the display section is raised.

* * * * *